(12) United States Patent
Lezzi et al.

(10) Patent No.: US 12,084,381 B2
(45) Date of Patent: *Sep. 10, 2024

(54) LOW-MODULUS ION-EXCHANGEABLE GLASSES

(71) Applicant: CORNING INCORPORATED, Corning, NY (US)

(72) Inventors: Peter Joseph Lezzi, Corning, NY (US); Liying Zhang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 699 days.

This patent is subject to a terminal disclaimer.

(21) Appl. No.: 17/117,465

(22) Filed: Dec. 10, 2020

(65) Prior Publication Data

US 2021/0179482 A1 Jun. 17, 2021

Related U.S. Application Data

(60) Provisional application No. 62/947,817, filed on Dec. 13, 2019.

(30) Foreign Application Priority Data

Feb. 12, 2020 (NL) ..................................... 2024883

(51) Int. Cl.
C03C 3/087 (2006.01)
C03C 21/00 (2006.01)

(52) U.S. Cl.
CPC ............ *C03C 3/087* (2013.01); *C03C 21/002* (2013.01)

(58) Field of Classification Search
CPC .............................. C03C 3/087; C03C 21/002
See application file for complete search history.

(56) References Cited

U.S. PATENT DOCUMENTS

| | | | |
|---|---|---|---|
| 8,854,623 B2 | 10/2014 | Fontaine et al. | |
| 9,290,413 B2 | 3/2016 | Dejneka et al. | |
| 9,670,088 B2 | 6/2017 | Gomez et al. | |
| 9,701,580 B2 * | 7/2017 | Smedskjaer | C03C 3/091 |
| 9,714,192 B2 | 7/2017 | Ellison et al. | |
| 10,125,044 B2 | 11/2018 | Gross et al. | |
| 10,173,923 B2 | 1/2019 | Kawamoto et al. | |
| 11,820,703 B2 * | 11/2023 | Lezzi | C03C 3/087 |
| 2011/0045961 A1 | 2/2011 | Dejneka et al. | |
| 2012/0052275 A1 | 3/2012 | Hashimoto et al. | |
| 2012/0083401 A1 | 4/2012 | Koyama et al. | |
| 2013/0004758 A1 | 1/2013 | Dejneka et al. | |
| 2014/0050911 A1 | 2/2014 | Mauro et al. | |
| 2015/0132579 A1 | 5/2015 | Guo et al. | |
| 2015/0140325 A1 | 5/2015 | Gross et al. | |
| 2015/0246846 A1 | 9/2015 | Choju et al. | |
| 2016/0207823 A1 | 7/2016 | Ding et al. | |
| 2017/0320769 A1 | 11/2017 | Guo et al. | |
| 2019/0012514 A1 | 1/2019 | Jin et al. | |
| 2021/0269353 A1 | 9/2021 | Gross | |

FOREIGN PATENT DOCUMENTS

| | | |
|---|---|---|
| WO | 2015/116649 A1 | 8/2015 |
| WO | 2020/028284 A1 | 2/2020 |

OTHER PUBLICATIONS

European Patent Application No. 20213513.3, Extended European Search Report dated Jan. 19, 2021; 7 pages; European Patent Office.
Schairer et al., "The nature of residual liquids from crystallization, with data on the system nepheline-diopside-silica", American Journal of Science, vol. 258, 1960, pp. 273-283.
ASTM C336-71(2015), "Standard Test Method for Annealing Point and Strain Point of Glass by Fiber Elongation".
ASTM C338-93(2013), "Standard Test Method for Softening Point of Glass".
ASTM C693-93(2013), "Standard Test Method for Density of Glass by Buoyancy".
ASTM C829-81 (2015), titled "Standard Practice for Measurement of Liquidus Temperature of Glass by the Gradient Furnace Method."
ASTM C965-96 (2012), titled "Standard Practice for Measuring Viscosity of Glass Above the Softening Point".
ASTM E2001-13, titled "Standard Guide for Resonant Ultrasound Spectroscopy for Defect Detection in Both Metallic and Non-metallic Parts."
ASTM E228, "Standard Test Method for Linear Thermal Expansion of Solid Materials With a Push-Rod Dilatometer".
ASTM standard C770-16, entitled "Standard Test Method for Measurement of Glass Stress-Optical Coefficient,".

* cited by examiner

*Primary Examiner* — Elizabeth A. Bolden
(74) *Attorney, Agent, or Firm* — Jeffrey A. Schmidt

(57) ABSTRACT

Ion-exchanged alkali aluminosilicate glass articles with a ratio of peak compressive stress value to Young's modulus value of 14 or more. The glass articles may include $Al_2O_3$ mol %+RO mol %≥18 mol %, where RO mol %=MgO mol %+CaO mol %, and be substantially free of ZnO, SrO, BaO, $B_2O_3$, $P_2O_5$, $Li_2O$, and $K_2O$. The glass articles may have a peak compressive stress value in a range of 850 MPa to 1400 MPa. The glass articles are suitable for various high-strength applications, including cover glass applications that experience significant bending stresses during use, for example, cover glasses for flexible displays.

15 Claims, 6 Drawing Sheets

LOW-MODULUS ION-EXCHANGEABLE GLASSES

RELATED APPLICATION

This application claims the benefit of priority under 35 U.S.C. § 119 of Netherlands Application Serial No. 2024883 filed on Feb. 12, 2020 and U.S. Provisional Application Ser. No. 62/947,817 filed on Dec. 13, 2019, the contents of each of which are relied upon and incorporated herein by reference in their entireties.

FIELD

The present disclosure relates to ion-exchangeable glass compositions. Specifically, embodiments described herein relate to ion-exchangeable glass compositions for use in various industries, for example, consumer electronics, transportation, architecture, defense, medicine, and packaging. Even more specifically, the present disclosure relates to glass compositions for cover glass applications, for example, cover glass for a flexible display.

BACKGROUND

Many consumer products, for example smart phones, tablets, portable media players, personal computers, and cameras, incorporate cover glasses that may function as display covers, and may incorporate touch functionality. Frequently, these devices are dropped by users onto hard surfaces, which can cause damage to the cover glasses, and may negatively impact the use of the devices, for example, the touch functionality may be compromised.

Foldable or flexible displays for consumer electronics applications may benefit from thin, flexible ion-exchanged glass. Glass can be made more resistant to flexure failure through ion-exchange processes, which involve inducing compressive stresses on the glass surfaces. The compressive stress introduced using an ion-exchange process serves to, among other things, arrest flaws that can cause failure of the glass.

Therefore, a continuing need exists for ion-exchangeable glass compositions having desirable mechanical properties for use in a variety of applications, including cover glass applications.

BRIEF SUMMARY

The present disclosure is directed to ion-exchangeable glass compositions having suitable strength and flexibility for various applications, for example cover glass applications for electronic devices. The glass compositions disclosed herein have an ($Al_2O_3$ mol %+RO mol %) value greater than or equal to 18 mol %. The glass compositions are designed to maximize a ratio of peak compressive stress value to Young's modulus value. A high ratio, for example a ratio of 14 or more, allows the glass compositions to resist failure during a bending event. Also, the strength imparted to the glass compositions by an ion-exchange process provides the glass composition with desirable mechanical properties for resisting fracture during use.

A first aspect (1) of the present application is directed to an ion-exchanged alkali aluminosilicate glass article, the glass article comprising: $SiO_2$, 13.5 mol % or more $Al_2O_3$, 1 mol % to 5 mol % MgO, CaO, $Na_2O$, where: $Al_2O_3$ mol %+RO mol %≥18 mol %, RO mol %=MgO mol %+CaO mol %, and the glass article is substantially free of ZnO, SrO, BaO, $B_2O_3$, $P_2O_5$, $Li_2O$, and $K_2O$. The glass article also has a Young's modulus value measured in GPa before being ion-exchanged and a compressive stress layer extending from a surface of the glass article to a depth of compression, the compressive stress layer having a peak compressive stress value measured in MPa, where a ratio of the peak compressive stress value to the Young's modulus value is 14 or more.

In a second aspect (2), the glass article according to the first aspect (1) is provided and $Al_2O_3$ mol %+RO mol %≥20 mol %.

In a third aspect (3), the glass article according to either of the first aspect (1) or the second aspect (2) is provided and ($Na_2O$ mol %+RO mol %−$Al_2O_3$ mol %)≥0 mol %.

In a fourth aspect (4), the glass article according any of aspects (1)-(3) is provided and 7 mol %≥($Na_2O$ mol %+RO mol %−$Al_2O_3$ mol %)≥0 mol %.

In a fifth aspect (5), the glass article according to any of aspects (1)-(4) is provided and the glass article has a liquidus viscosity in a range of 50 kP to 500 kP, measured before being ion-exchanged.

In a sixth aspect (6), the glass article according to any of aspects (1)-(5) is proved and the glass article comprises 0.5 mol % to 2 mol % CaO, and $Al_2O_3$ mol %+RO mol %≥20 mol %.

In a seventh aspect (7), the glass article according to any of aspects (1)-(6) is provided and the ratio of the peak compressive stress value to the Young's modulus value is 15 or more, and 18 or less.

In an eighth aspect (8), the glass article according to any of aspects (1)-(7) is provided and the Young's modulus value is in a range of 70 GPa to 80 GPa.

In a ninth aspect (9), the glass article according to any of aspects (1)-(8) is provided and the peak compressive stress is in a range of 850 MPa to 1400 MPa.

In a tenth aspect (10), the glass article according to any of aspects (1)-(9) is provided and the depth of compression is in a range of 5 microns to 40 microns.

In an eleventh aspect (11), the glass article according to any of aspects (1)-(9) is provided and the depth of compression is in a range of 5 microns to 20 microns.

In a twelfth aspect (12), the glass article according to any of aspects (1)-(11) is provided and the depth of compression is in a range of 5% to 20% of a thickness of the glass article.

In a thirteenth aspect (13), the glass article according to any of aspects (1)-(12) is provided and the peak compressive stress is in a range of 1100 MPa to 1350 MPa and the depth of compression in a range of 5 microns to 20 microns.

In a fourteenth aspect (14), the glass article according to any of aspects (1)-(13) is provided and the glass article comprises: 59 mol % to 66 mol % $SiO_2$, 13.5 mol % to 20 mol % $Al_2O_3$, 0.5 mol % to 2 mol % CaO, and 15 mol % to 18 mol % $Na_2O$.

In a fifteenth aspect (15), the glass article according to any of aspects (1)-(13) is provided and the glass article comprises: 60 mol % to 65 mol % $SiO_2$, 16 mol % to 18 mol % $Al_2O_3$, 2 mol % to 4 mol % MgO, 0.5 mol % to 2 mol % CaO, and 15 mol % to 18 mol % $Na_2O$.

In a sixteenth aspect (16) the glass article according to the fifteenth aspect (15) is provided and $Al_2O_3$ mol %+RO mol %≥20 mol %.

In a seventeenth aspect (17), the glass article according to any of aspects (1)-(13) is provided and the glass article comprises 16 mol % or more $Al_2O_3$.

In an eighteenth aspect (18), the glass article according to any of aspects (1)-(17) is provided and 23 mol %≥$Al_2O_3$ mol %+RO mol %≥18 mol %.

In a nineteenth aspect (19), the glass article according to any of aspects (1)-(18) is provided and (MgO mol %/(MgO mol %+CaO mol %))≥0.5.

In a twentieth aspect (20), the glass article according to any of aspects (1)-(18) is provided and (MgO mol %/(MgO mol %+CaO mol %))≥0.55.

In a twenty-first aspect (21), the glass article according to any of aspects (1)-(20) is provided and the glass article has a thickness of 4 millimeters or less.

In a twenty-second aspect (22), the glass article according to any of aspects (1)-(20) is provided and the glass article has a thickness in a range of 15 microns to 200 microns.

A twenty-third aspect (23) of the present application is directed to an electronic device including an electronic display and the glass article according to any of aspects (1)-(22) disposed over the electronic display.

In a twenty-fourth aspect (24), the electronic device according to the twenty-third aspect (23) is provided and the electronic device includes a housing including a front surface, a back surface, and side surfaces; and electrical components at least partially within the housing, the electrical components including a controller, a memory, and the electronic display, the electronic display at or adjacent the front surface of the housing, where the glass article forms at least a portion of the housing.

A twenty-fifth aspect (25) of the present application is directed to an ion-exchanged glass article comprising: 59 mol % to 66 mol % $SiO_2$, 13.5 mol % to 20 mol % $Al_2O_3$, 1 mol % to 5 mol % MgO, 0.5 mol % to 2 mol % CaO, 15 mol % to 18 mol % $Na_2O$, a Young's modulus value measured in GPa before ion-exchanging the glass article, and a compressive stress layer extending from a surface of the ion-exchanged glass article and having a peak compressive stress value measured in MPa, where: $Al_2O_3$ mol %+RO mol %≥18 mol %, RO mol %=MgO mol %+CaO mol %, the glass article is substantially free of ZnO, SrO, BaO, $B_2O_3$, $P_2O_5$, $Li_2O$, and $K_2O$, and a ratio of the peak compressive stress value to the Young's modulus value is 14 or more, and 18 or less.

In a twenty-sixth aspect (26), the glass article according to the twenty-fifth aspect (25) is provided and the glass article comprises: 60 mol % to 65 mol % $SiO_2$, 16 mol % to 18 mol % $Al_2O_3$, 2 mol % to 4 mol % MgO, 0.5 mol % to 2 mol % CaO, and 15 mol % to 18 mol % $Na_2O$.

In a twenty-seventh aspect (27), the glass article according to either the twenty-fifth aspect (25) or the twenty-sixth aspect (26) is provided and the glass article has a thickness in a range of 20 microns to 200 microns.

A twenty-eighth aspect (28) of the present application is directed to a method of strengthening a glass article, the method including immersing the glass article in an ion-exchange solution including 50 wt % or more of a potassium salt, the glass article comprising: $SiO_2$, 13.5 mol % or more $Al_2O_3$, 1 mol % to 5 mol % MgO, CaO, and $Na_2O$, where: $Al_2O_3$ mol %+RO mol %≥18 mol %, RO mol %=MgO mol %+CaO mol %, and the glass article is substantially free of ZnO, SrO, BaO, $B_2O_3$, $P_2O_5$, $Li_2O$, and $K_2O$; and ion-exchanging the glass article in the ion-exchange solution for a time period in a range of 1 hour to 24 hours at a temperature in a range of 350° C. to 480° C. to achieve a compressive stress layer extending from a surface of the glass article to a depth of compression and comprising a peak compressive stress value in a range of 850 MPa to 1400 MPa.

In a twenty-ninth aspect (29), the method according to the twenty-eighth aspect (28) is provided and the depth of compression is in a range of 5 microns to 40 microns.

In a thirtieth aspect (30), the method according to the twenty-eighth aspect (28) is provided and the depth of compression is in a range of 5 microns to 20 microns.

In a thirty-first aspect (31), the method according to any of aspects (28)-(30) is provided and the peak compressive stress value is in a range of 1100 MPa to 1350 MPa and the depth of compression is in a range of 5 microns to 20 microns.

In a thirty-second aspect (32), the method according to any of aspects (28)-(31) is provided and the time period is in a range of 1 hour to 8 hours.

In a thirty-third aspect (33), the method according to any of aspects (28)-(32) is provided and the glass article has a liquidus viscosity in a range of 50 kP to 500 kP measured before being immersed in the ion-exchange solution.

In a thirty-fourth aspect (34), the method according to any of aspects (28)-(33) is provided and the glass article has a Young's modulus value measured in GPa before being immersed in the ion-exchange solution, and a ratio of the peak compressive stress value to the Young's modulus value is 14 or more, and is 18 or less.

In a thirty-fifth aspect (35), the method according to the thirty-fourth aspect (34) is provided and the ratio of the peak compressive stress value to the Young's modulus value is 15 or more, and is 18 or less.

In a thirty-sixth aspect (36), the method according to any of aspects (28)-(35) is provided and the glass article comprises: 59 mol % to 66 mol % $SiO_2$, 13.5 mol % to 20 mol % $Al_2O_3$, 0.5 mol % to 2 mol % CaO, and 15 mol % to 18 mol % $Na_2O$.

In a thirty-seventh aspect (37), the method according to any aspects (28)-(35) is provided and the glass article comprises: 60 mol % to 65 mol % $SiO_2$, 16 mol % to 18 mol % $Al_2O_3$, 2 mol % to 4 mol % MgO, 0.5 mol % to 2 mol % CaO, and 15 mol % to 18 mol % $Na_2O$.

In a thirty-eighth aspect (38), the method according to any of aspects (28)-(37) is provided and 23 mol %≥$Al_2O_3$ mol %+RO mol %≥18 mol %.

In a thirty-ninth aspect (39), the method according to any of aspects (28)-(38) is provided and the glass article has a thickness of 4 millimeters or less.

In a fortieth aspect (40), the method according to any of aspects (28)-(38) is provided and the glass article has a thickness in a range of 15 microns to 200 microns.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
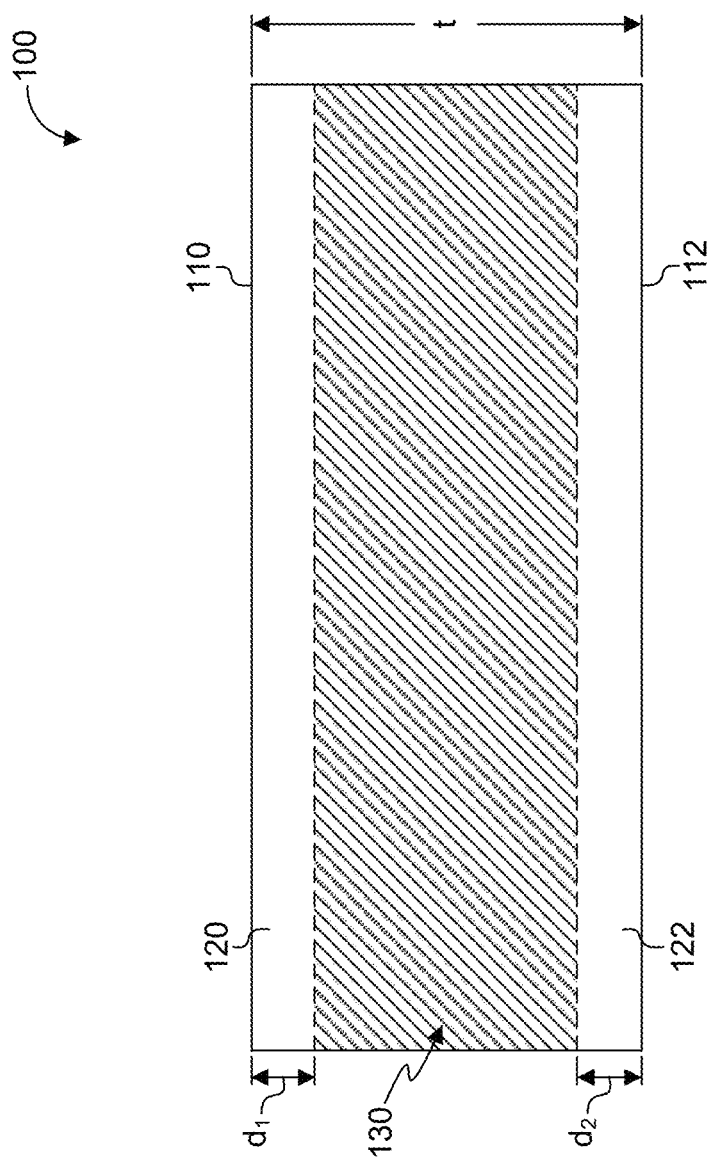
FIG. 1 illustrates a cross section of a glass article having compressive stress regions according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Glasses described herein are a family of ion-exchangeable alkali aluminosilicate glasses that may be ion-exchanged to achieve high peak compressive stress. As used herein, "ion-exchangeable" means that a glass composition, or glass article comprising the composition, is capable of exchanging first cations located at or near the surface of the substrate with second cations of the same valence. The first ions may be ions of sodium. The second ions may be ions of one of potassium, rubidium, and cesium, with the proviso that the second ion has an ionic radius greater than the ionic radius of the first ion. The first ion is present in the glass-based substrate as an oxide thereof (e.g., $Na_2O$). As used herein, "ion-exchanged glass" or "chemically strengthened glass" means the glass has been subject to at least one ion-exchange process that exchanges cations located at or near the surface of the glass with cations of the same valence.

Glass compositions described herein can be ion-exchanged to achieve a high peak compressive stress. In some embodiments, the glasses described herein may be ion-exchanged to achieve a peak compressive stress of about 1000 MPa or more, and up to about 1400 MPa. High peak compressive stress imparted during an ion-exchange process can provide high strength for glasses with shallow flaw size distributions, thereby preventing failure during bending. The high peak compressive stress allows the glass to retain net compression and thus contain surface flaws when the glass is subjected to bending around a tight radius. Glasses according to embodiments described herein have low Young's moduli, which results in a lower bending stress values during bending, and can thus prevent failure during a bending event.

In addition, glass compositions described herein have a ratio of peak compressive stress value to Young's modulus value (peak compressive stress value/Young's modulus value, CS/E, where CS is in MPa and E is in GPa) of 14 or more across a broad depth of compression range for compressive regions created by an ion-exchange process. Increasing this ratio is difficult because surface compressive stresses imparted during an ion-exchange process can have a strong influence from Young's modulus in that a higher Young's modulus is a common path to improving compressive stress. That is, Young's modulus is a measure of the stiffness of the network. For example: exchanging a K+ ion into a Na+ site gives compressive stress, but as the network becomes stiffer (as by increasing Young's modulus) then the dilatational stress is higher. Therefore one common way to get a higher CS is to just increase the Young's modulus, but what has been done in this disclosure is to increase CS without significantly increasing Young's modulus. With a high CS/E ratio, the glass compositions can remain flexible even after ion-exchange. Glass compositions described herein have a low enough Young's modulus before ion-exchange and the value of compressive stress that can be imparted during an ion-exchange process in high enough to achieve a high CS/E ratio across a broad depth of compression range. This results in glass compositions that are flexible and can also be ion-exchanged to high surface compressive stress values. The glass compositions are able to be ion-exchanged to exhibit high surface compressive stresses and large depths of compression, for example depths as high as 50 micrometers (microns and/or μm), because the compositions resist stress relaxation that can occur during an ion-exchange process. Stress relaxation, which can be more pronounced with elevated temperature and time, is apt to occur during ion-exchange processes designed to impart high depths of compression. These characteristics of the glass compositions described herein make them suitable for various industrial applications, including high-strength cover glass applications that experience significant bending stresses in use, for example, as cover glass in flexible and foldable displays.

As used herein, "peak compressive stress" refers to the highest compressive stress (CS) value measured within a compressive stress region. In some embodiments, the peak compressive stress is located at the surface of the glass. In other embodiments, the peak compressive stress may occur at a depth below the surface, giving the compressive stress profile the appearance of a "buried peak." Unless specified otherwise, compressive stress (including surface CS) is measured by surface stress meter (FSM) using commercially available instruments for example the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient."

As used herein, "depth of compression" (DOC) refers to the depth at which the stress within the glass article changes from compressive to tensile. At the DOC, the stress crosses from a compressive stress to a tensile stress and thus exhibits a stress value of zero. Depth of compression and depth of layer may be measured by a surface stress meter, for example, a FSM-6000 surface stress meter. As used herein, "depth of layer" (DOL) refers to the depth within a glass article at which an ion of a metal oxide diffuses into the glass article where the concentration of the ion reaches a minimum value. In embodiments where only potassium is ion-exchanged into a glass article, DOC can equal DOL. Unless specified otherwise herein, DOC and DOL are the same.

Glass compositions described herein can also be manufactured at reasonable cost. The glass compositions exhibit suitably high liquidus temperatures and suitably low liquidus viscosities for certain manufacturing techniques, for example slot drawing. These thermal properties can increase ease of manufacturing glass articles made from the compositions, which can reduce cost. Glass compositions described in this disclosure have, among other things, an aluminum oxide content, a magnesium oxide content, and a value for $Na_2O$ mol %+RO mol %≥$Al_2O_3$ mol % that aid in melting during manufacturing. In some embodiments, the glass compositions can have a liquidus viscosity in a range of 50 kP (kiloPoise) to 500 kP.

Glass compositions described herein can provide one or more of the following benefits. (1) The compositions are lithium free, but are capable of achieving high compressive stress values during ion-exchange (for example, up to 1400 MPa) at small depths of layer (DOL) and up to about 1250 MPa even at a higher DOL of about 40 microns (micrometers, μm). (2) The compositions have a low modulus, which facilitates higher CS/E ratios and improves bendability for thin foldable applications. (3) Raw materials to make these glasses are cheap and readily available. (4) The compositions have a high per-modifier content, which allows for easier melting. A "per-modifier" content for a glass composition means that the value for ($R_2O$ mol %+RO mol %−$Al_2O_3$ mol %) is greater than 0 mol %, where $R_2O$ mol % is the total mol % of all alkali metal oxides in the composition and where RO mol % is the total mol % of all alkali earth metal oxides in the composition. (5) The compositions have low liquidus temperatures, high liquidus viscosities, and slow-growing liquidus phases, which are all beneficial for sheet forming.

As used herein, the term "glass" is meant to include any material made at least partially of glass, including glass and glass-ceramics. "Glass-ceramics" include materials produced through controlled crystallization of glass. One or more nucleating agents, for example, titanium oxide ($TiO_2$), zirconium oxide ($ZrO_2$), sodium oxide ($Na_2O$), and phosphorus oxide ($P_2O_5$) may be added to a precursor glass composition to facilitate homogenous crystallization to produce glass-ceramics.

For glass compositions described herein, the concentration of constituent components (e.g., $SiO_2$, $Al_2O_3$, $Na_2O$, and the like) are given in mole percent (mol %) on an oxide basis, unless otherwise specified. Components of the glass compositions according to embodiments are discussed individually below. It should be understood that any of the variously recited ranges of one component may be individually combined with any of the variously recited ranges for any other component. As used herein, a trailing 0 in a number is intended to represent a significant digit for that number. For example, the number "1.0" includes two significant digits, and the number "1.00" includes three significant digits. As used herein, a composition described as including an oxide within a range defined by 0 mol % as the lower bound means that the composition includes the oxide at any amount above 0 mol % (e.g., 0.01 mol % or 0.1 mol %) and up to the upper bound of the range.

$SiO_2$ may be the largest constituent in the glass composition and, as such, is the primary constituent of the glass network formed from the glass composition. Pure $SiO_2$ has a relatively low coefficient of thermal expansion (CTE—as used herein this property is measured at a temperature from 0° C. to 300° C.) and is alkali free. However, pure $SiO_2$ has a high melting point. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass.

In some embodiments, the glass composition may include $SiO_2$ in an amount from 55 mol % or more to 70 mol % or less, and all ranges and subranges between the foregoing values. In some embodiments, the glass composition may include $SiO_2$ in an amount of 56 mol % or more, 57 mol % or more, 58 mol % or more, 59 mol % or more, 60 mol % or more, 61 mol % or more, 62 mol % or more, 63 mol % or more, 64 mol % or more, 65 mol % or more, 66 mol % or more, 67 mol % or more, 68 mol % or more, 69 mol % or more, or 70 mol %. In some embodiments, the glass composition may include $SiO_2$ in an amount of 69 mol % or less, 68 mol % or less, 67 mol % or less, 66 mol % or less, 65 mol % or less, 64 mol % or less, 63 mol % or less, 62 mol % or less, 61 mol % or less, 60 mol % or less, 59 mol % or less, 58 mol % or less, 57 mol % or less, 56 mol % or less, or 55 mol %.

Any of the above $SiO_2$ ranges may be combined with any other range. For example, in some embodiments, the glass composition may include $SiO_2$ in an amount of 55 mol % to 70 mol %, 56 mol % to 69 mol %, 57 mol % to 68 mol %, 58 mol % to 67 mol %, 59 mol % to 66 mol %, 60 mol % to 65 mol %, 61 mol % to 64 mol %, or 62 mol % to 63 mol %, and all ranges and sub-ranges between the foregoing values having any two of the above-listed $SiO_2$ values as endpoints, including the endpoints. In some embodiments, the glass composition may include $SiO_2$ in a range of 59 mol % to 66 mol %. In some embodiments, the glass composition may include $SiO_2$ in a range of 60 mol % to 65 mol %.

Glass compositions disclosed herein include $Al_2O_3$. The addition of $Al_2O_3$ may serve as a glass network former. Furthermore, when the concentration of $Al_2O_3$ is balanced against the concentration of $SiO_2$ and the concentration of alkali oxides in the composition, it may reduce the liquidus temperature of the glass melt, thereby enhancing the liquidus viscosity.

In some embodiments, the mol % of $Al_2O_3$ plus the mol % of RO ($Al_2O_3$ mol %+RO mol %) in the composition may be greater than or equal to 18 mol %. In some embodiments, $Al_2O_3$ mol %+RO mol % may be greater than or equal to 18 mol % to less than or equal to 23 mol % (for example, 23 mol %≥$Al_2O_3$ mol %+RO mol %≥18 mol %), including all ranges and subranges between the foregoing values. In some embodiments, $Al_2O_3$ mol %+RO mol % may be greater than or equal to 19 mol %, greater than or equal to 20 mol %, greater than or equal to 21 mol %, or greater than or equal to 22 mol %. In some embodiments, $Al_2O_3$ mol %+RO mol % may be less than or equal to 22 mol %, less than or equal to 21 mol %, less than or equal to 20 mol %, or less than or equal to 19 mol %. In the above equation, RO mol % equals MgO mol % plus CaO mol %.

Any of the above ranges may be combined with any other range. For example, in some embodiments, $Al_2O_3$ mol %+RO mol % may be 18 mol % to 23 mol %, 19 mol % to 22 mol %, or 20 mol % to 21 mol %, and all ranges and sub-ranges between the foregoing values having any two of the above-listed values as endpoints, including the endpoints. In some embodiments, $Al_2O_3$ mol %+RO mol % may be greater than or equal to 20 mol %.

The ($Al_2O_3$ mol %+RO mol %) values described above benefit the glass compositions disclosed herein. With the ($Al_2O_3$ mol %+RO mol %) values as described above, the glass compositions are able to achieve the high peak compressive stresses across a broad depth of compression range as discussed herein. If ($Al_2O_3$ mol %+RO mol %) is below 18 mol %, then desirably high ion-exchange stresses may not be formed. If ($Al_2O_3$ mol %+RO mol %) is above 23 mol %, then the ion-exchange process can be too slow and/or the Young's modulus can be undesirably high. Also, the manufacturability of a glass composition can suffer from a value above 23 mol %.

In some embodiments, the glass composition may include $Al_2O_3$ in a concentration of 13 mol % or more to 20 mol % or less, and all ranges and sub-ranges between the foregoing values. In some embodiments, the glass composition may include $Al_2O_3$ in an amount of 13 mol % or more, 13.5 mol % or more, 14 mol % or more, 14.5 mol % or more, 15 mol % or more, 15.5 mol % or more, 16 mol % or more, 16.5 mol % or more, 17 mol % or more, 17.5 mol % or more, 18 mol % or more, 18.5 mol % or more, 19 mol % or more, 19.5 mol % or more, or 20 mol %. In some embodiments, the glass composition may include $Al_2O_3$ in an amount of 20 mol % or less, 19.5 mol % or less, 19 mol % or less, 18.5 mol % or less, 18 mol % or less, 17.5 mol % or less, 17 mol % or less, 16.5 mol % or less, 16 mol % or less, 15.5 mol % or less, 15 mol % or less, 14.5 mol % or less, 14 mol % or less, 13.5 mol % or less, or 13 mol %.

Any of the above $Al_2O_3$ ranges may be combined with any other range. For example, in some embodiments, the glass composition may include $Al_2O_3$ in an amount of 13 mol % to 20 mol %, 13.5 mol % to 19.5 mol %, 14 mol % to 19 mol %, 14.5 mol % to 18.5 mol %, 15 mol % to 18 mol %, 15.5 mol % to 17.5 mol %, or 16 mol % to 17 mol %, and all ranges and sub-ranges between the foregoing values having any two of the above-listed $Al_2O_3$ values as endpoints, including the endpoints. In some embodiments, the glass composition may include $Al_2O_3$ in an amount of 13.5 mol % to 20 mol %. In some embodiments, the glass composition may include $Al_2O_3$ in an amount of 16 mol % or more. In some embodiments, the glass composition may include $Al_2O_3$ in an amount of 16 mol % to 18 mol %.

Glass compositions described herein include $Na_2O$. $Na_2O$ may aid in the ion-exchangeability of the glass composition, and improve the formability, and thereby manufacturability, of the glass composition. However, if too much $Na_2O$ is added to the glass composition, the CTE may be too low, and the melting point may be too high. In some embodiments, the glass composition may include $Na_2O$ in a concentration of 15 mol % or more to 18 mol % or less, and all ranges and sub-ranges between the foregoing values having any two of the above-listed values as endpoints, including the endpoints. In some embodiments, the glass composition may include $Na_2O$ in an amount of 15 mol % or more, 15.5 mol % or more, 16 mol % or more, 16.5 mol % or more, 17 mol % or more, 17.5 mol % or more, or 18 mol %. In some embodiments, the glass composition may include $Na_2O$ in an amount of 18 mol % or less, 17.5 mol % or less, 17 mol % or less, 16.5 mol % or less, 16 mol % or less, 15.5 mol % or less, or 15 mol %.

Any of the above $Na_2O$ ranges may be combined with any other range. For example, in some embodiments, the glass composition may include $Na_2O$ in an amount from 15.5 mol % to 17.5 mol %, 16 mol % to 17 mol %, or 16.5 mol % to 17 mol %, and all ranges and sub-ranges between the foregoing values having any two of the above-listed $Na_2O$ values as endpoints, including the endpoints.

In some embodiments, the mol % of $Na_2O$+the mol % of RO−the mol % of $Al_2O_3$ ($Na_2O$ mol %+RO mol %−$Al_2O_3$ mol %) for the glass composition is greater than or equal to 0 mol %. In some embodiments, $Na_2O$ mol %+RO mol %−$Al_2O_3$ mol % may be greater than or equal to 0 mol % and less than or equal to 7 mol % (for example, 7 mol %≥($Na_2O$ mol %+RO mol %−$Al_2O_3$ mol %)≥0 mol %), including all ranges and subranges between the foregoing values. In some embodiments, $Na_2O$ mol %+RO mol %−$Al_2O_3$ mol % may be greater than or equal to 1 mol %, greater than or equal to 2 mol %, greater than or equal to 3 mol %, greater than or equal to 4 mol %, greater than or equal to 5 mol %, or greater than or equal to 6 mol %. In some embodiments, $Na_2O$ mol %+RO mol %−$Al_2O_3$ mol % may be less than or equal to 7 mol %, less than or equal to 6 mol %, less than or equal to 5 mol %, less than or equal to 4 mol %, less than or equal to 3 mol %, less than or equal to 2 mol %, or less than or equal to 1 mol %. In the above equation, RO mol % equals MgO mol % plus CaO mol %.

Any of the above ranges may be combined with any other range. For example, in some embodiments, $Na_2O$ mol %+RO mol %−$Al_2O_3$ may be 1 mol % to 6 mol %, 2 mol % to 5 mol %, or 3 mol % to 4 mol %, and all ranges and sub-ranges between the foregoing values having any two of the above-listed values as endpoints, including the endpoints.

The ($Na_2O$ mol %+RO mol %−$Al_2O_3$ mol %) values described above benefit the glass compositions disclosed herein. With the ($Na_2O$ mol %+RO mol %−$Al_2O_3$ mol %) values as described above, the glass compositions exhibit the following advantageous properties. First, tailoring the ($Na_2O$ mol %+RO mol %−$Al_2O_3$ mol %) values as described above improves the meltability of the glass compositions. The ($Na_2O$ mol %+RO mol %−$Al_2O_3$ mol %) values create advantageous thermal properties, for example liquidus temperatures and liquidus viscosities as discussed herein, which increase ease of manufacturing glass articles made from the compositions. If the ($Na_2O$ mol %+RO mol %−$Al_2O_3$ mol %) value is below 0 mol %, the meltability of the glass composition suffers. Second, tailoring the ($Na_2O$ mol %+RO mol %−$Al_2O_3$ mol %) values as described above ensures an ion-exchanging window that can generate a desirable composition gradient while avoiding significant stress relaxation with a glass article that counteracts compressive stresses imparted by an ion-exchange process. If the value ($Na_2O$ mol %+RO mol %−$Al_2O_3$ mol %) is above 7 mol %, a significant amount of stress relation within a glass article can occur during an ion-exchange process. This stress relaxation reduces the compressive stress, and in particular the peak compressive stress, imparted during an ion-exchange process.

Glass compositions described herein include MgO. MgO may lower the viscosity of a glass, which enhances the formability and manufacturability of the glass. The inclusion of MgO in a glass composition may also improve the strain point and the Young's modulus of the glass composition as well as the ion-exchange-ability of the glass. However, if too much MgO is added to the glass composition, the density and the CTE of the glass composition may increase to undesirable levels.

In some embodiments, the glass composition may include MgO in a concentration of from 1 mol % or more to 5 mol % or less, and all ranges and sub-ranges between the foregoing values. In some embodiments, the glass composition may include MgO in an amount of 1.5 mol % or more, 2 mol % or more, 2.5 mol % or more, 3 mol % or more, 3.5 mol % or more, 4 mol % or more, 4.5 mol % or more, or 5 mol %. In some embodiments, the glass composition may include MgO in an amount of 4.5 mol % or less, 4 mol % or less, 3.5 mol % or less, 3 mol % or less, 2.5 mol % or less, 2 mol % or less, 1.5 mol % or less, or 1 mol %.

Any of the above MgO ranges may be combined with any other range. For example, in some embodiments, the glass composition may include MgO in an amount of 1 mol % to 5 mol %, 1.5 mol % to 4.5 mol %, 2 mol % to 4 mol %, 2.5 mol % to 3.5 mol %, or 2.5 mol % to 3 mol %, and all ranges and sub-ranges between the foregoing values having any two of the above-listed MgO values as endpoints, including the endpoints. In some embodiments, the glass composition may include MgO in a range of 2 mol % to 4 mol %.

Glass compositions described herein include CaO. CaO may lower the viscosity of a glass, which may enhance the formability, the strain point and the Young's modulus, and may improve the ion-exchange-ability of the glass. However, if too much CaO is added to the glass composition, the density and the CTE of the glass composition may increase to undesirable levels.

In some embodiments, the glass composition may include CaO in a concentration of 0.1 mol % or more to 2.5 mol % or less, and all ranges and sub-ranges between the foregoing values. In some embodiments, the glass composition may include CaO in an amount of 0.5 mol % or more, 1 mol % or more, 1.5 mol % or more, 2 mol % or more, or 2.5 mol %. In some embodiments, the glass composition may include CaO in amount of 2.5 mol % or less, 2 mol % or less, 1.5 mol % or less, 1 mol % or less, 0.5 mol % or less, or 0.1 mol %.

Any of the above ranges may be combined with any other range. For example, in some embodiments, the glass composition may include CaO in an amount of 0.1 mol % to 2.5 mol %, 0.5 mol % to 2 mol %, or 1 mol % to 1.5 mol %, and all ranges and sub-ranges between the foregoing values having any two of the above-listed CaO values as endpoints, including the endpoints. In some embodiments, the glass composition may include CaO in a range of 0.5 mol % to 2 mol %.

In some embodiments, the ratio of the mol % for MgO to the mol % of MgO plus the mol % of CaO (MgO mol %/(MgO mol %+CaO mol %)) for the glass composition may be 0.5 or more. In some embodiments, MgO mol %/(MgO mol %+CaO mol %) may be greater than or equal to 0.5 and less than or equal to 0.9 (for example, 0.9≥(MgO mol %/(MgO mol %+CaO mol %))≥0.5), including all ranges and subranges between the foregoing values. In some embodiments, MgO mol %/(MgO mol %+CaO mol %) may be greater than or equal to 0.55, greater than or equal to 0.6, greater than or equal to 0.65, greater than or equal to 0.7, greater than or equal to 0.75, greater than or equal to 0.8, greater than or equal to 0.85, or equal to 0.9. In some embodiments, MgO mol %/(MgO mol %+CaO mol %) may be less than or equal to 0.9, less than or equal to 0.85, less than or equal to 0.8, less than or equal to 0.75, less than or equal to 0.7, less than or equal to 0.65, less than or equal to 0.6, less than or equal to 0.55, or equal to 0.5.

Any of the above ranges may be combined with any other range. For example, in some embodiments, MgO mol %/(MgO mol %+CaO mol %) may be 0.5 to 0.9, 0.55 to 0.85, 0.6 to 0.8, 0.65 to 0.75, or 0.65 to 0.7, and all ranges and sub-ranges between the foregoing values having any two of the above-listed values as endpoints, including the endpoints.

Glass compositions described herein may be free or substantially free of one or more of: ZnO, SrO, BaO, $B_2O_3$, $P_2O_5$, $Li_2O$, and $K_2O$. In some embodiments, the glass composition may be free or substantially free of all of: ZnO, SrO, BaO, $B_2O_3$, $P_2O_5$, $Li_2O$, and $K_2O$. Some of these oxides can be expensive and/or in limited supply. The alkali earth metal oxides can undesirably increase Young's modulus and can slow an ion-exchange process. $B_2O_3$, $P_2O_5$, and $K_2O$ can decrease the amount of compressive stress imparted during an ion-exchange process. Glass articles described herein are able to achieve advantageous properties without the need for these oxides. Accordingly, these oxides may be excluded from the composition. As used herein, the term "substantially free" means that the component is not added as a component of the batch material even though the component may be present in the final glass in very small amounts as a contaminant. As a result of the raw materials and/or equipment used to produce a glass composition of the present disclosure, certain impurities or components that are not intentionally added, can be present in the final glass composition. Such materials are present in the glass composition in minor amounts, referred to "tramp materials." A composition that is "substantially free" of a component means that the component was not purposefully added to the composition, but the composition may still comprise the component in tramp or trace amounts. A composition that is "substantially free" of an oxide means that the oxide is present at an amount less than or equal to 0.1 mol %, for example 0 mol % to 0.1 mol %. As used herein, a glass composition that is "free" of a component, is defined as meaning that the component (e.g., oxide) is not present in the composition, even in tramp or trace amounts.

In some embodiments, the glass composition may optionally include one or more fining agents. In some embodiments, the fining agents may include, for example, $SnO_2$. In such embodiments, $SnO_2$ may be present in the glass composition in an amount of 2 mol % or less, for example from 0 mol % to 2 mol %, and all ranges and sub-ranges between the foregoing values. In some embodiments, $SnO_2$ may be present in the glass composition in an amount of 0.1 mol % to 2 mol %, 0.1 mol % to 1.5 mol %, 0.1 mol % to 1 mol %, or 0.1 mol % to 0.5 mol %.

Physical properties of the glass compositions disclosed herein, and glass articles made from the glass compositions, are discussed below. These physical properties can be achieved by tailoring the component amounts of the glass composition, as will be discussed in more detail with reference to the examples.

In some embodiments, the Young's modulus (E) of a glass composition may be from 70 gigapascals (GPa) or more to 80 GPa or less, and all ranges and sub-ranges between the foregoing values. In some embodiments, the glass composition may have a Young's modulus from 71 GPa or more to 79 GPa or less, 72 GPa or more to 78 GPa or less, 73 GPa or more to 77 GPa or less, 74 GPa or more to 76 GPa or less, or 75 GPa or more to 76 GPa or less, and all ranges and sub-ranges between the foregoing values having any two of the above-listed Young's modulus values as endpoints, including the endpoints. For example, in some embodiments, the glass composition may have a Young's modulus in a range of 70 GPa to 80 GPa, 71 GPa to 79 GPa, 72 GPa to 78 GPa, 73 GPa to 77 GPa, 74 GPa to 76 GPa, or 75 GPa to 76 GPa. In some embodiments, the glass composition may have a Young's modulus in a range of 70 GPa to 75 GPa. Unless specified otherwise, the Young's modulus values and Poisson's ratio values disclosed in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts." Also, unless specified otherwise, the Young's modulus and Poisson's ratio of a glass composition or article is measured before the composition or article is subjected to any ion-exchange process, or any other strengthening process. In particular, the Young's modulus and Poisson's ratio of a glass composition or article is measured before the composition or article is exposed to an ion-exchange solution, for example, before being immersed in an ion-exchange solution. A Poisson's ratio value (v) is calculated based on the Young's modulus value (E) and shear modulus value (G) obtained from the ASTM E2001-13 test using the following formula: $E=2G(1+v)$.

In some embodiments, the liquidus viscosity of the glass composition may be 50 kiloPoise (kP) or more to 500 kP or less, and all ranges and sub-ranges between the foregoing values. In some embodiments, the glass composition may have a liquidus viscosity of 100 kP or more to 450 kP or less, 150 kP or more to 400 kP or less, 200 kP or more to 350 kP or less, or 250 kP or more to 300 kP or less, and all ranges and sub-ranges between the foregoing values having any two of the above-listed liquidus viscosity values as endpoints, including the endpoints. For example, in some embodiments, the glass composition may have a liquidus viscosity in a range of 50 kP to 500 kP, 100 kP to 450 kP, 150 kP to 400 kP, 200 kP to 350 kP, or 250 kP to 300 kP.

As used herein, the term "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature. Unless specified otherwise, a liquidus viscosity value disclosed in this application is determined by the following method. First, the liquidus temperature of the glass is measured in accordance with ASTM C829-81 (2015), titled "Standard Practice for Measurement of Liquidus Temperature of Glass by the Gradient Furnace Method." Next, the viscosity of the glass at the liquidus temperature is measured in accordance with ASTM C965-96 (2012), titled "Standard Practice for Measuring Viscosity of Glass Above the Softening Point". Unless specified otherwise, the liquidus viscosity and temperature of a glass composition or article is measured before the composition or article is subjected to any ion-exchange process, or any other strengthening process. In particular, the liquidus viscosity and temperature of a glass composition or article is measured before the composition or article is exposed to an ion-exchange solution, for example, before being immersed in an ion-exchange solution.

From the above compositions, glass articles according to embodiments may be formed by any suitable method, for example slot forming, float forming, rolling processes, fusion forming processes, etc. The glass composition and the articles produced therefrom may be characterized by the manner in which it may be formed. For instance, the glass composition may be characterized as float-formable (i.e., formed by a float process), down-drawable and, in particular, fusion-formable or slot-drawable (for example, formed by a down draw process, for example a fusion draw process or a slot draw process).

Some embodiments of the glass articles described herein may be formed by a down-draw process. Down-draw processes produce glass articles having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass articles may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass articles described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot and/or nozzle and is drawn downward as a continuous glass article and into an annealing region.

Drawing processes for forming glass articles, for example, glass sheets, are desirable because they allow a thin glass article to be formed with few defects. It was previously thought that glass compositions were required to have relatively high liquidus viscosities—for example a liquidus viscosity greater than 1000 kP, greater than 1100 kP, or greater than 1200 kP—to be formed by a drawing process, for example, fusion drawing or slot drawing. However, developments in drawing processes may allow glasses with lower liquidus viscosities to be used in drawing processes.

In one or more embodiments, the glass articles described herein may exhibit an amorphous microstructure and may be substantially free of crystals or crystallites. In other words, the glass articles exclude glass-ceramic materials in some embodiments. In some embodiments, the glass articles described herein may include glass-ceramic materials.

As mentioned above, the glass compositions, and articles made from the glass compositions, can be strengthened by an ion-exchange process. With reference to FIG. 1, a glass article 100 may have one or more regions under compressive stress. For example, glass article 100 may have a first compressive stress region 120 and/or a second compressive stress region 122, extending from exterior surfaces of glass article 100 (e.g., surfaces 110, 112) to a depth of compression (DOC, d1, d2) and a second region (e.g., central region 130) under a tensile stress or CT extending from the DOC into the central or interior region of glass article 100. Ion-exchanged compressive stress regions 120, 122 have a concentration of a metal oxide that is different at two or more points through a thickness (t) of glass article 100.

According to the convention normally used in the art, compression or compressive stress (CS) is expressed as a negative (<0) stress and tension or tensile stress is expressed as a positive (>0) stress. Throughout this description, however, CS is expressed as a positive or absolute value—i.e., as recited herein, CS=|CS|. The CS may have a maximum at the surface of the glass, and vary with distance d from the surface according to a function. Referring again to FIG. 1, a first compressive stress region 120 extends from first surface 110 to a depth d1 and a second compressive stress region 122 extends from second surface 112 to a depth dz. Together, these compressive stress regions 120, 122 define the compression region or CS region of glass article 100.

In some embodiments, the peak compressive stress of one or more compressive stress regions of the glass article may be from greater than or equal to 850 MPa to less than or equal to 1400 megapascals (MPa), for example from greater than or equal to 900 MPa to less than or equal to 1350 MPa, from greater than or equal to 950 MPa to less than or equal to 1300 MPa, from greater than or equal to 1000 MPa to less than or equal to 1250 MPa, from greater than or equal to 1050 MPa to less than or equal to 1200 MPa, or from greater than or equal to 1100 MPa to less than or equal to 1150 MPa, and all ranges and sub-ranges between the foregoing values having any two of the above-listed values as endpoints, including the endpoints. For example, in some embodiments, the peak compressive stress may be in a range of 850 MPa to 1400 MPa, 900 MPa to 1350 MPa, 950 MPa to 1300 MPa, 1000 MPa to 1250 MPa, 1050 MPa to 1200 MPa, or 1100 MPa to 1150 MPa, or within any range having any two of these values as endpoints, inclusive of the endpoints. In some embodiments, the peak compressive stress of one or more compressive stress regions of the glass article may be in a range of 1100 MPa to 1350 MPa.

In some embodiments, glass articles made from the glass compositions may have a ratio of peak compressive stress value to Young's modulus value (peak compressive stress value/Young's modulus value, CS/E) of 14 or more. In some embodiments, the glass article may have a CS/E ratio in a range of 14 or more to 18 or less, and all ranges and sub-ranges between the foregoing values. In some embodiments, the glass article may have a CS/E ratio of 15 or more, 16 or more, 17 or more, or 18. In some embodiments, the glass article may have a CS/E ratio of 18 or less, 17 or less, 16 or less, 15 or less, or 14. Any of the above CS/E ranges may be combined with any other range. For example, in some embodiments, the CS/E ratio may be 14 to 18, 15 to 17, or 15 to 16, and all ranges and sub-ranges between the foregoing values having any two of the above-listed values as endpoints, including the endpoints. In some embodiments, the glass article may have a CS/E ratio of 15 or more.

These CS/E ratios, and CS/E ratio ranges, may be achieved at the peak compressive stress and/or at the depths of compression described herein. For example, in some embodiments, a glass article may have a CS/E ratio, or CS/E ratio range, as described above with a peak compressive stress in a range of 850 MPa to 1400 MPa. As another example, a glass article may have a CS/E ratio, or CS/E ratio range, as described above with a depth of compression in a range of 5 microns to 40 microns. As another example, a glass article may have a CS/E ratio, or CS/E ratio range, as described above with a depth of compression in a range of 5 microns to 20 microns. As another example, a glass article may have a CS/E ratio, or CS/E ratio range, as described above with a depth of compression in a range of 5% to 20% of a thickness of the glass article. As another example, a glass article may have a CS/E ratio, or CS/E ratio range, as described above with a peak compressive stress in a range of 1100 MPa to 1350 MPa and a depth of compression in a range of 5 microns to 20 microns. As another example, a glass article may have a CS/E ratio, or CS/E ratio range, as described above with a peak compressive stress in a range of 850 MPa to 1400 MPa and a depth of compression in a range of 5 microns to 40 microns. As another example, a glass article may have a CS/E ratio, or CS/E ratio range, as described above with a peak compressive stress in a range of 850 MPa to 1400 MPa and a depth of compression in a range of 5 microns to 20 microns.

The high peak compressive stresses that may be achieved by ion-exchange provides the capability to bend the glass to a tighter (i.e., smaller) bend radius for a given glass thickness. The high peak compressive stress allows the glass to retain net compression and thus contain surface flaws when the glass is subjected to bending around a tight radius. Near-surface flaws cannot extend to failure if they are contained under this net compression, or are disposed within the effective surface compressive layer.

Figure 2:
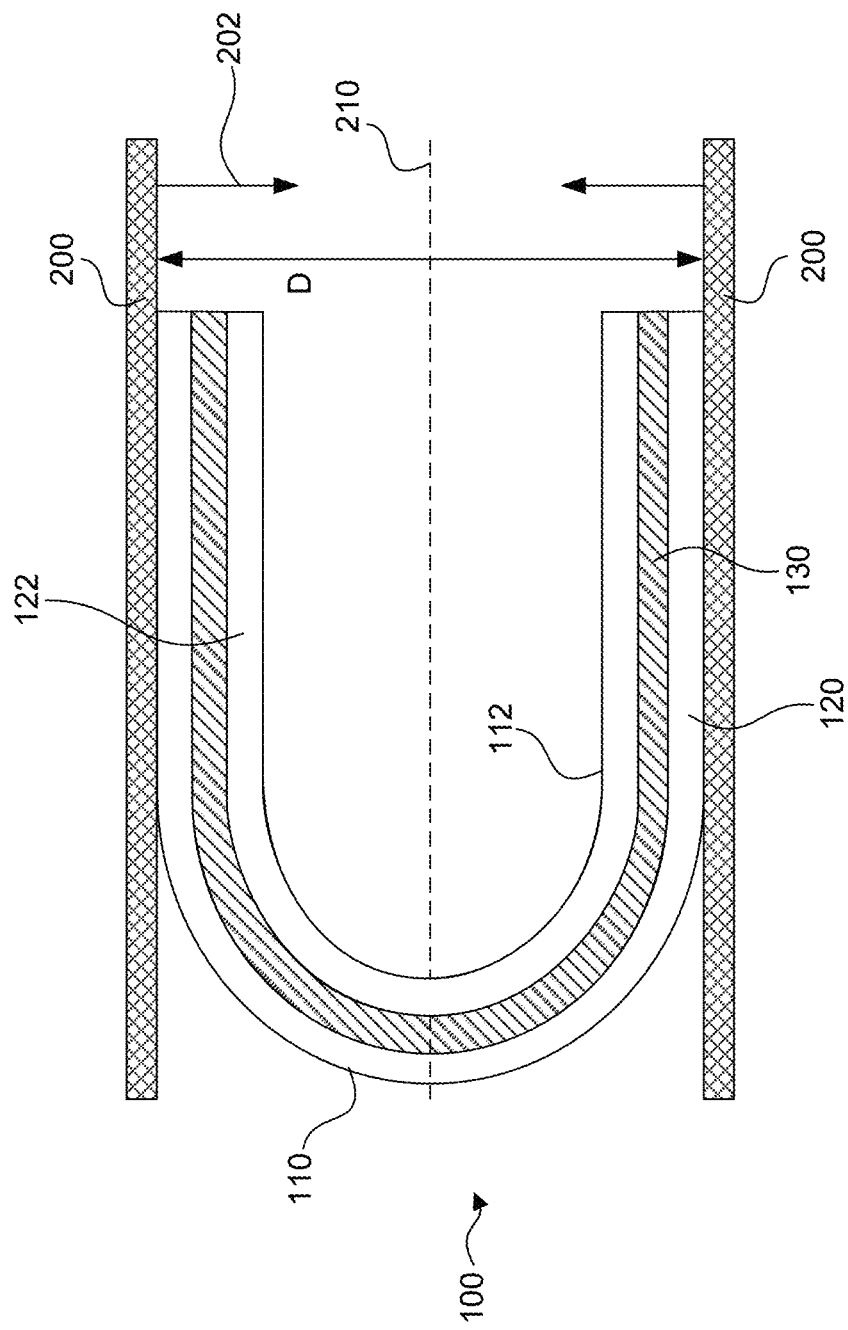
FIG. 2 illustrates a cross-sectional view of a glass article according to some embodiments upon bending of the glass article.

FIG. 2 illustrates two-point bending of a glass article 100 between two plates 200 using a bend force 202. A bend force 202 is applied using a two-point bend test apparatus where two plates 200 are pressed against glass article 100 during a bending test with a constant force, bend force 202. If needed, fixtures associated with the test apparatus ensure that glass article 100 is bent symmetrically relative to a fold line 210 as the bend force 202 is applied to glass article 100 via plates 200. Plates 200 can be moved together in unison until a particular plate distance D is achieved. As used herein, the term "failure" under a bending force refers to breakage, destruction, delamination, crack propagation, permanent deformation, or other mechanism that render an article unsuitable for its intended purpose.

In FIG. 2, surface 110 of glass article 100 is subjected to a tensile stress from the bending, which causes an effective DOC from the surface to decrease from the DOC from surface 110 when the article is unbent, while surface 112 is subjected to additional compressive stress from the bending. The effective DOC from surface 110 increases with increasing plate distance and decreases with decreasing plate distance (when surface 112 of article 100 is bent towards itself as shown in FIG. 2). In other words, the effective DOC is the DOC in an unbent condition minus an effective depth from the tensile stress induced by the bend.

In some embodiments, glass article 100 avoids failure during a static two-point bend test when held between two plates 200 at a plate distance (D) of 10 millimeters (mm) or less for 240 hours at 60° C. and 93% relative humidity. For example, in some embodiments, glass article 100 avoids failure during a static two-point bend test when held between two plates for 240 hours at 60° C. and 93% relative humidity to a plate distance (D) of 10 mm to 1 mm. The plate distance (D) may be for example, 10 mm, 9 mm, 8 mm, 7 mm, 6 mm, 5 mm, 4 mm, 3 mm, 2 mm, or 1 mm.

The compressive stress of both regions 120 and 122 is balanced by stored tension in the central region 130 of glass article 100. Unless specified otherwise, CT values are reported as maximum CT values. DOC may be measured by a surface stress meter or a scattered light polariscope (SCALP) depending on the ion exchange treatment and the thickness of the article being measured. Where the stress in the substrate is generated by exchanging potassium ions into the substrate, a surface stress meter, for example, the FSM-6000 (Orihara Industrial Co., Ltd., Japan), is used to measure depth of compression. Where the stress is generated by exchanging sodium ions into the substrate, and the article being measured is thicker than about 400 microns, SCALP is used to measure the depth of compression and maximum central tension (CT). Where the stress in the substrate is generated by exchanging both potassium and sodium ions into the glass, and the article being measured is thicker than about 400 microns, the depth of compression and CT are measured by SCALP. Without wishing to be bound by theory, the exchange depth of sodium may indicate the depth of compression while the exchange depth of potassium ions may indicate a change in the magnitude of the compressive stress (but not necessarily the change in stress from compressive to tensile). As used herein, "depth of layer" means the depth that the ions have exchanged into the substrate (e.g., sodium, potassium). Through the disclosure, when the maximum central tension cannot be measured directly by SCALP (as when the article being measured is thinner than about 400 microns) the maximum central tension can be approximated by product of a maximum compressive stress and a depth of compression divided by the difference between the thickness of the substrate and twice the depth of compression, wherein the compressive stress and depth of compression are measured by FSM.

When the substrate thickness is greater than about 400 microns, the refracted near-field (RNF) method may also be used to derive a graphical representation of the stress profile. When the RNF method is utilized to derive a graphical representation of the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

When a SCALP measurement is performed, it is done using SCALP polariscope (e.g., SCALP-04 or SCALP-05), available from GlassStress Ltd., Talinn, Estonia. The precise sample speed SS and exposure times $t_E$ to reduce the measurement noise in the polarimeter to an acceptable level when measuring a sample to characterize at least one stress-related characteristic depends on a number of factors. These factors include the characteristics of the image sensing device (e.g., the gain, image capture rate (frames/second), pixel size, internal pixel average techniques, etc.), as well as the nature of the no-stress-related (NSR) scattering feature(s), the intensity of the input light beam, the number of polarization states used, etc. Other factors include the measurement wavelength of the light beam from the laser source and the intensity of the scattered light beam. Example measurement wavelengths can include 640 nanometers (nm), 518 nm and 405 nm. Example exposure times can range from 0.05 millisecond to 100 milliseconds. Example frame rates can range from 10 to 200 frames per second. Example calculations of the optical retardation can utilize from two to two-hundred frames over a measurement time $t_M$ of from 0.1 seconds to 10 seconds.

In some embodiments, the glass article may have a maximum CT from greater than or equal to 20 MPa to less than or equal to 400 megapascals (MPa), for example from greater than or equal to 50 MPa to less than or equal to 350 MPa, from greater than or equal to 75 MPa to less than or equal to 300 MPa, from greater than or equal to 100 MPa to less than or equal to 250 MPa, or from greater than or equal to 150 MPa to less than or equal to 200 MPa, and all ranges and sub-ranges between the foregoing values having any two of the above-listed values as endpoints, including the endpoints. For example, in some embodiments, the maximum CT may be in a range of 20 MPa to 400 MPa, 50 MPa to 350 MPa, 75 MPa to 300 MPa, 100 MPa to 250 MPa, or 150 MPa to 200 MPa, or within an range having any two of these values as endpoints, inclusive of the endpoints.

In some embodiments, the DOC of region 120 and/or region 122 may be in a range of 5 microns to 50 microns, including subranges. For example, the DOC may be 5 microns, 10 microns, 15 microns, 20 microns, 25 microns, 30 microns, 35 microns, 40 microns, 45 microns, or 50 microns, or within a range having any two of these values as endpoints, inclusive of the endpoints. In some embodiments, the DOC of region 120 and/or region 122 may be in a range of 10 microns to 45 microns, 15 microns to 40 microns, 20 microns to 35 microns, or 25 microns to 30 microns. In some embodiments, the DOC may be in a range of 5 microns to 40 microns. In some embodiments, the DOC may be in a range of 5 microns to 20 microns.

In some embodiments, DOC may be reported as a portion of the thickness (t) of the glass article 100. In embodiments, glass articles may have a depth of compression (DOC) from greater than or equal to 5% (0.05 t) of the thickness of the glass article to less than or equal to 20% (0.20 t) of the thickness of the glass article, and all ranges and sub-ranges between the foregoing values. In some embodiments, the DOC may be 5% to 20% of the thickness of the glass article, 5% to 10% of the thickness of the glass article, or 5% to 15% of the thickness of the glass article.

Thickness (t) of glass article 100 is measured between surface 110 and surface 112. In some embodiments, the thickness of glass article 100 may be 4 millimeters (mm) or less. In some embodiments, the thickness of glass article 100 may be in a range of 15 microns to 4 mm, including subranges. For example, the thickness of glass article 100 may be 15 microns, 20 microns, 30 microns, 50 microns, 75 microns, 100 microns, 150 microns, 200 microns, 250 microns, 500 microns, 1 mm, 1.5 mm, 2 mm, 2.5 mm, 3 mm, 3.5 mm, or 4 mm, or within a range having any two of these values as endpoints, inclusive of the endpoints. In some embodiments, the thickness of glass article 100 may be in a range of 20 microns to 3.5 mm, 30 microns to 3 mm, 50 microns to 2.5 mm, 75 microns to 2 mm, 100 microns to 1.5 mm, 150 microns to 1 mm, 200 microns to 500 microns, or 200 microns to 250 microns. In some embodiments, the thickness of glass article 100 may be in a range of 15 microns to 200 microns. In some embodiments, the thickness of glass article 100 may be in a range of 15 microns to 100 microns.

Compressive stress layers may be formed in the glass article by exposing the glass article to an ion-exchange solution. In some embodiments, the ion-exchange solution may include a molten potassium salt. In some embodiments, the ion-exchange solution may include 50 wt % or more potassium salt, 60 wt % or more potassium salt, 70 wt % or more potassium salt, 80 wt % or more potassium salt, 90 wt % or more potassium salt, or 100 wt % potassium salt, and all ranges and sub-ranges between the foregoing values. In some embodiments, the ion-exchange solution may include 50 wt % to 100 wt % potassium salt, 60 wt % to 100 wt % potassium salt, 70 wt % to 100 wt % potassium salt, 80 wt % to 100 wt % potassium salt, or 90 wt % to 100 wt % potassium salt. In some embodiments, the potassium salt may be $KNO_3$. In some embodiments, all or a portion of the remaining weight percent in an ion-exchange solutions may be a molten nitrate salt, for example, $NaNO_3$.

The glass article may be exposed to the ion-exchange solution by immersing a glass article made from the glass composition into a bath of the ion-exchange solution, spraying the ion-exchange solution onto a glass article made from the glass composition, or otherwise physically applying the ion-exchange solution to the glass article. Upon exposure to the glass article, the ion-exchange solution may, according to embodiments, be at a temperature from greater than or equal to 350° C. to less than or equal to 480° C. and all ranges and sub-ranges between the foregoing values. In some embodiments, the temperature may be from greater than or equal to 360° C. to less than or equal to 470° C., from greater than or equal to 370° C. to less than or equal to 460° C., from greater than or equal to 380° C. to less than or equal to 450° C., from greater than or equal to 390° C. to less than or equal to 440° C., from greater than or equal to 400° C. to less than or equal to 430° C., or from greater than or equal to 410° C. to less than or equal to 420° C., and all ranges and sub-ranges between the foregoing values and having any two of the above-listed temperature values as endpoints, including the endpoints. In some embodiments, the temperature of the ion-exchange solution may be in a range 350° C. to 480° C., 360° C. to 470° C., 370° C. to 460° C., 380° C. to 450° C., 390° C. to 440° C., 400° C. to 430° C., or 410° C. to 420° C.

In some embodiments, the glass article may be exposed to the ion-exchange solution for a duration from greater than or equal to 1 hour to less than or equal to 24 hours, and all ranges and sub-ranges between the foregoing values. In some embodiments, the duration may be from greater than or equal to 2 hours to less than or equal to 20 hours, from greater than or equal to 4 hours to less than or equal to 16 hours, from greater than or equal to 6 hours to less than or equal to 12 hours, or from greater than or equal to 8 hours to less than or equal to 12 hours, and all ranges and sub-ranges between the foregoing values and having any two of the above-listed time values as endpoints, including the endpoints. In some embodiments, the glass article may be exposed to the ion-exchange solution for a duration of 1 hour to 24 hours, 2 hours to 20 hours, 4 hours to 16 hours, or 8 hours to 12 hours. In some embodiments, the duration may be in a range of 1 hour to 10 hours, or 2 hours to 8 hours.

After an ion-exchange process is performed, it should be understood that a composition at the surface of a glass article may be different than the composition of the as-formed glass article (for example, the glass article before it undergoes an ion-exchange process). This results from one type of alkali metal ion in the as-formed glass, for example, for example Na+, being replaced with larger alkali metal ions, for example K+. However, the glass composition at or near the center of the depth of the glass article will, in some embodiments, still have the composition of the as-formed glass article. Unless specified otherwise, glass compositions disclosed in this application are compositions of the glass article near the center of the depth of the article where the composition is unaffected (or is least affected) by an ion-exchange process, i.e., the composition of the as-formed glass article.

Figure 3:
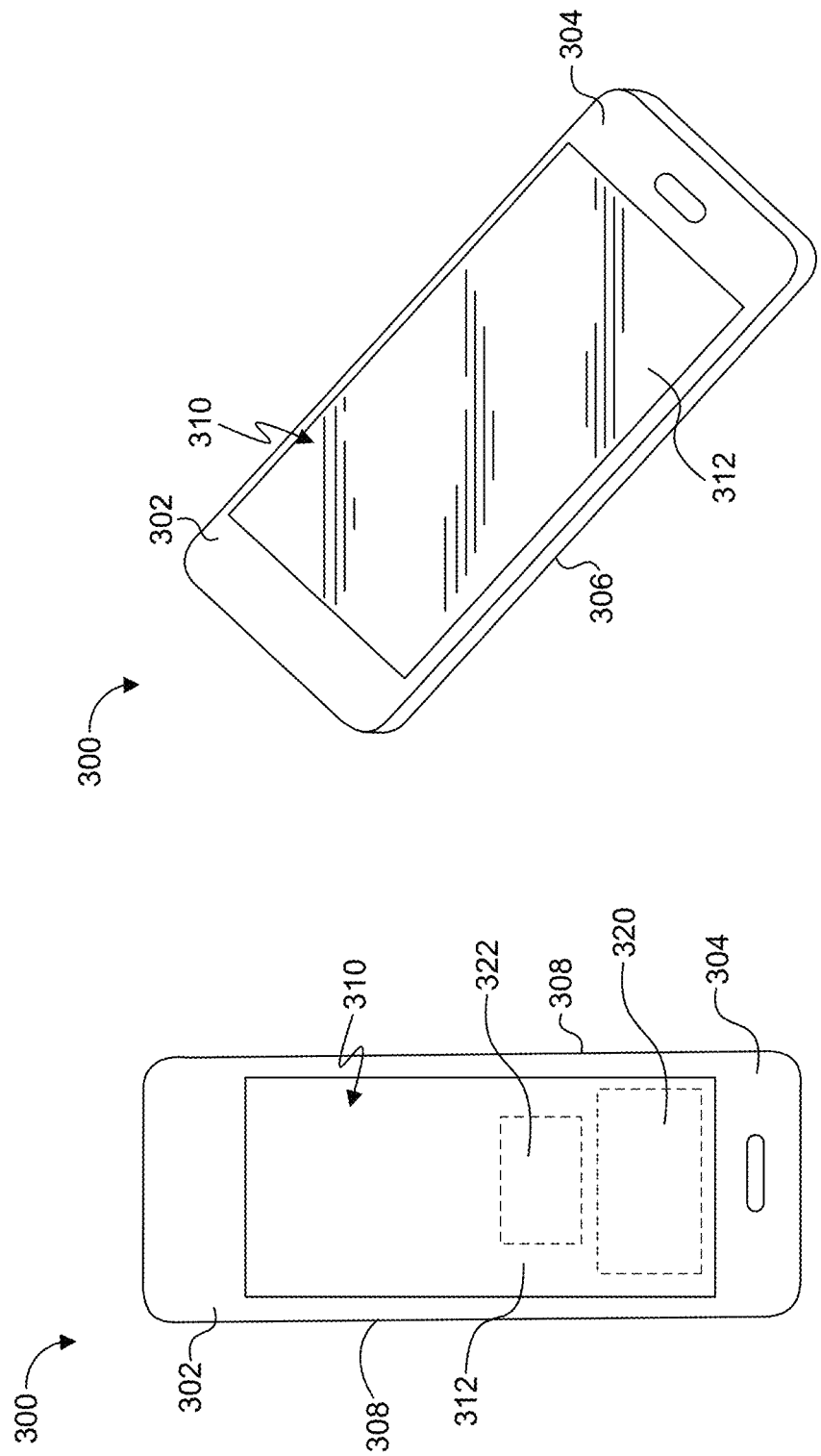
FIG. 3A is a plan view of an exemplary electronic device incorporating a glass article according to any of the glass articles disclosed herein.
FIG. 3B is a perspective view of the exemplary electronic device of FIG. 3A.

The glass articles disclosed herein may be incorporated into another article for example an article with a display (or display articles) (e.g., consumer electronics, including mobile phones, watches, tablets, computers, navigation systems, and the like), architectural articles, transportation articles (e.g., automobiles, trains, aircraft, sea craft, etc.), appliance articles, or any article that may benefit from some transparency, scratch-resistance, abrasion resistance or a combination thereof. An exemplary article incorporating any of the glass articles disclosed herein is shown in FIGS. 3A and 3B. Specifically, FIGS. 3A and 3B show a consumer electronic product 300 including a housing 302 having a front surface 304, a back surface 306, and side surfaces 308. Electrical components that are at least partially inside or entirely within the housing may include at least a controller 320, a memory 322, and a display 310 at or adjacent to front surface 306 of housing 302. Display 310 may be, for example, a light emitting diode (LED) display or an organic light emitting diode (OLED) display.

A cover substrate 312 may be disposed at or over front surface 304 of housing 302 such that it is disposed over display 310. Cover substrate 312 may include any of the glass articles disclosed herein and may be referred to as a "cover glass." Cover substrate 312 may serve to protect display 310 and other components of consumer electronic product 300 (e.g., controller 320 and memory 322) from damage. In some embodiments, cover substrate 312 may be bonded to display 310 with an adhesive. In some embodiments, cover substrate 312 may define all or a portion of front surface 304 of housing 302. In some embodiments, cover substrate 312 may define front surface 304 of housing 302 and all or a portion of side surfaces 308 of housing 302. In some embodiments, consumer electronic product 300 may include a cover substrate defining all or a portion of back surface 306 of housing 302.

EXAMPLES

Embodiments will be further clarified by the following examples. It should be understood that these examples are not limiting to the embodiments described above.

Glass compositions having components listed in Table 1 below were prepared by conventional glass forming methods. Compositions 1-4 in Table 1 are glass compositions according to embodiments of the present application. Composition A in Table 1 is a comparative composition made with similar oxides. In Table 1, all components are in mol %. The CS and CT values reported in Table 1 were measured at the sample thickness reported in the table for each Composition.

Table 2 lists material properties of the compositions in Table 1. The Young's modulus (E) values reported in Table 2 were measured according to the methods disclosed in this specification. Similarly, the shear modulus values were measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

Additional material properties listed in Table 2 include: density, where the density values were determined using the buoyancy method of ASTM C693-93(2013); low temperature (in a range of 0° C. to 300° C.) CTE measured in part per million (ppm) per degree Celsius (ppm/° C.); strain, anneal and softening points, where the strain points were determined using the beam bending viscosity method of ASTM C598-93(2013), annealing points were determined using the fiber elongation method of ASTM C336-71(2015), and softening points were determined using the fiber elongation method of ASTM C338-93(2013); $10^{11}$ Poise, 35 kP, 200 kP, and liquidus temperatures; liquidus viscosities, where the liquidus viscosity is determined as discussed herein; and stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Unless specified otherwise, the properties listed in Table 2 were measured before the composition or article was subjected to any ion-exchange process, or any other strengthening process. The CTE values reported in Table 2 where measured using a fiber elongation technique. A dilatometer was set up according to ASTM E228 ("Standard Test Method for Linear Thermal Expansion of Solid Materials With a Push-Rod Dilatometer"). For the fiber elongation test, a fiber sample of a particular composition mounted in the dilatometer was inserted into a 0° C. ice bath and then a 300° C. isothermal furnace to determine the average linear coefficient of thermal expansion over that temperature range. The fiber samples were prepared by flameworking.

Table 3 includes ion-exchange conditions and properties for Compositions 1-4 and Composition A of Table 1. For the ion-exchange processes reported in Table 3, samples of each composition were immersed in a molten salt bath composed of 100 wt % KNO₃. Each sample had a length of 1 inch, a width of 1 inch, and a thickness of 0.8 mm. The maximum CT values reported in Table 3 were approximated by the product of a maximum compressive stress and a depth of compression divided by the difference between the thickness of the substrate and twice the depth of compression, wherein the compressive stress and depth of compression were measured by FSM.

TABLE 1

| Analyzed mol % | Composition 1 | Composition 2 | Composition 3 | Composition 4 | Composition A |
|---|---|---|---|---|---|
| $SiO_2$ | 59.75 | 61.33 | 62.91 | 65.47 | 68.95 |
| $Al_2O_3$ | 19.11 | 17.37 | 16.27 | 13.82 | 10.27 |
| $P_2O_5$ | 0.00 | 0.00 | 0.00 | 0.00 | 0.00 |
| $B_2O_3$ | 0.00 | 0.00 | 0.00 | 0.00 | 0.00 |
| MgO | 1.81 | 2.62 | 2.96 | 4.00 | 5.36 |
| CaO | 1.81 | 1.45 | 1.19 | 0.69 | 0.06 |
| SrO | 0.00 | 0.00 | 0.00 | 0.00 | 0.00 |
| ZnO | 0.00 | 0.00 | 0.00 | 0.00 | 0.00 |
| $Li_2O$ | 0.00 | 0.00 | 0.00 | 0.00 | 0.00 |
| $Na_2O$ | 17.39 | 17.10 | 16.53 | 15.87 | 15.20 |
| $K_2O$ | 0.01 | 0.01 | 0.01 | 0.01 | 0.00 |
| $TiO_2$ | 0.01 | 0.01 | 0.01 | 0.01 | 0.00 |
| $SnO_2$ | 0.11 | 0.12 | 0.13 | 0.14 | 0.17 |
| $Fe_2O_3$ | 0.01 | 0.01 | 0.01 | 0.01 | 0.00 |
| $ZrO_2$ | 0.00 | 0.00 | 0.00 | 0.00 | 0.00 |
| Sum | 100.00 | 100.00 | 100.00 | 100.00 | 100.00 |
| $Al_2O_3$ + RO | 22.73 | 21.43 | 20.41 | 18.51 | 15.69 |
| (RO + $Na_2O$)—$Al_2O_3$ | 1.90 | 3.80 | 4.41 | 6.74 | 10.35 |
| MgO/(MgO + CaO) | 0.50 | 0.64 | 0.71 | 0.85 | 0.99 |
| CS/E with DOC ≈40 μm | 17.07 | 16.68 | 16.21 | 15.15 | 13.09 |
| Sample Thickness (mm) | 0.8 | 0.8 | 0.8 | 0.8 | 0.8 |
| CT with DOC ≈40 μm | ___ MPa | ___ MPa | ___ MPa | ___ MPa | ___ MPa |

TABLE 2

| Property | Composition 1 | Composition 2 | Composition 3 | Composition 4 | Composition A |
|---|---|---|---|---|---|
| Density | 2.478 | 2.470 | 2.466 | 2.453 | 2.432 |
| CTE (0-300° C.) ppm/° C. | 8.36 | 8.45 | 8.32 | 8.22 | 8.14 |
| Stain Point (fiber Elongation) | 680.0 | 657.0 | 647.0 | 628.0 | 599.0 |
| Annealing Point (fiber Elongation) | 736.0 | 712.0 | 703.0 | 683.0 | 652.0 |
| Softening Point (fiber Elongation) | 987.8 | 970.6 | 961.0 | 937.9 | 895.4 |
| 10^11 Poises | 825 | 802 | 794 | 772 | 740 |
| Strain PT (BBV) (10^14.68 P) | — | — | 656 | — | — |
| Annealing PT (BBV) (10^13.18 P) | — | — | 708.2 | — | — |
| Soft PT (PPV) (10^7.6 P) | — | 959.4 | 954.9 | — | — |
| Young's modulus (GPa) | 74.7 | 74.1 | 73.7 | 72.7 | 71.3 |
| Shear modulus (GPa) | 30.8 | 30.5 | 30.4 | 30.1 | 29.6 |
| Poisson's ratio | 0.214 | 0.212 | 0.212 | 0.211 | 0.205 |
| RI @ 589.3 nm | 1.5108 | 1.5093 | 1.5076 | 1.5047 | 1.4994 |
| SOC (546.1 nm) single PT | 2.920 | 2.942 | 2.960 | 2.973 | 2.970 |
| VFT parameters from HTV | 0 | 0.2 | 0.4 | 0.6 | |
| A | −3.859 | −3.82 | −3.112 | −3.268 | −2.148 |
| B | 8987.2 | 9376.5 | 8066.2 | 8670.8 | 6404.9 |
| To | 189.2 | 123.6 | 196.1 | 121.9 | 231.768 |
| isokom Temperature (° C.) | | | | | |
| 200 | 1648 | 1655 | 1686 | 1679 | 1671 |
| 35000 | 1259 | 1245 | 1250 | 1232 | 1189 |
| 200000 | 1170 | 1152 | 1155 | 1134 | 1092 |

TABLE 2-continued

| Property | Composition 1 | Composition 2 | Composition 3 | Composition 4 | Composition A |
|---|---|---|---|---|---|
| Liquidus (gradient boat) | | | | | |
| duration (hours) | 24 | 24 | 24 | 24 | 24 |
| Air (° C.) | 1240 | 1175 | 1125 | 1095 | 1020 |
| internal (° C.) | 1235 | 1165 | 1125 | 1085 | 1010 |
| Pt (° C.) | 1235 | 1165 | 1125 | 1085 | 1010 |
| primary phase | Nepheline | Nepheline | Nepheline | Forsterite | Forsterite |
| 2ndry phase | — | — | — | — | — |
| tertiary phase | — | — | — | — | — |
| liquidus viscosity (Internal) kP | 54 | 153 | 373 | 543 | 1208 |

TABLE 3

| 410° C. in 100% $KNO_3$ | Composition 1 | Composition 2 | Composition 3 | Composition 4 | Composition A |
|---|---|---|---|---|---|
| Time (hours) | 2.0 | 2.0 | 2.0 | 2.0 | 2.0 |
| CS (MPa) | 1288 | 1254 | 1221 | 1130 | 976 |
| DOC (μm) | 23.0 | 24.5 | 24.6 | 25.0 | 23.4 |
| CS/E (MPa/GPa) | 17.24 | 16.92 | 16.57 | 15.54 | 13.69 |
| Sample Thickness (mm) | 0.8 | 0.8 | 0.8 | 0.8 | 0.8 |
| CT (MPa) | 39 | 41 | 40 | 38 | 30 |
| Time (hours) | 4.0 | 4.0 | 4.0 | 4.0 | 4.0 |
| CS (MPa) | 1291 | 1246 | 1206 | 1103 | 954 |
| DOC (μm) | 32.6 | 33.3 | 34.8 | 35.1 | 32.6 |
| CS/E (MPa/GPa) | 17.28 | 16.82 | 16.36 | 15.17 | 13.38 |
| Sample Thickness (mm) | 0.8 | 0.8 | 0.8 | 0.8 | 0.8 |
| CT (MPa) | 57 | 57 | 57 | 53 | 42 |
| Time (hours) | 6.0 | 6.0 | 6.0 | 6.0 | 6.0 |
| CS (MPa) | 1275 | 1235 | 1195 | 1102 | 933 |
| DOC (μm) | 39.4 | 40.5 | 41.5 | 41.9 | 39.4 |
| CS/E (MPa/GPa) | 17.07 | 16.67 | 16.21 | 15.16 | 13.09 |
| Sample Thickness (mm) | 0.8 | 0.8 | 0.8 | 0.8 | 0.8 |
| CT (MPa) | 70 | 70 | 69 | 64 | 51 |
| Time (hours) | 8.0 | 8.0 | 8.0 | 8.0 | 8.0 |
| CS (MPa) | 1256 | 1222 | 1176 | 1080 | 916 |
| DOC (μm) | 45.9 | 47.2 | 48.4 | 48.3 | 45.7 |
| CS/E (MPa/GPa) | 16.81 | 16.5 | 15.96 | 14.86 | 12.85 |
| Sample Thickness (mm) | 0.8 | 0.8 | 0.8 | 0.8 | 0.8 |
| CT | 81 | 82 | 81 | 74 | 59 |

As shown in Table 3, Compositions 1-4 were all able to achieve a CS/E ratio higher than the CS/E ratio for Composition A, for each ion-exchange time. For an ion-exchange time of two hours, Composition A achieved a DOC of 23.4 microns and a CS/E ratio of 13.69, while Compositions 1-4 achieved comparable DOCs and significantly higher CS/E ratios. Each of Compositions 1-4 achieved a DOC of at least 23 microns and a CS/E ratio of at least 15.53 (an increase of at least about 13.4% compared to Composition A). For an ion-exchange time of four hours, Composition A achieved a DOC of 32.6 microns and a CS/E ratio of 13.38, while Compositions 1-4 achieved comparable DOCs and significantly higher CS/E ratios. Each of Compositions 1-4 achieved a DOC of at least 32.6 microns and a CS/E ratio of at least 15.16 (an increase of at least about 13.3% compared to Composition A). For an ion-exchange time of six hours, Composition A achieved a DOC of 39.4 microns and a CS/E ratio of 13.09, while Compositions 1-4 achieved comparable DOLs and significantly higher CS/E ratios. Each of Compositions 1-4 achieved a DOC of at least 39.4 microns and a CS/E ratio of at least 15.15 (an increase of at least about 15.7% compared to Composition A). For an ion-exchange time of eight hours, Composition A achieved a DOC of 45.7 microns and a CS/E ratio of 12.85, while Compositions 1-4 achieved comparable DOCs and significantly higher CS/E ratios. Each of Compositions 1-4 achieved a DOC of at least 45.9 microns and a CS/E ratio of at least 14.85 (an increase of at least about 15.6% compared to Composition A).

Figure 4:
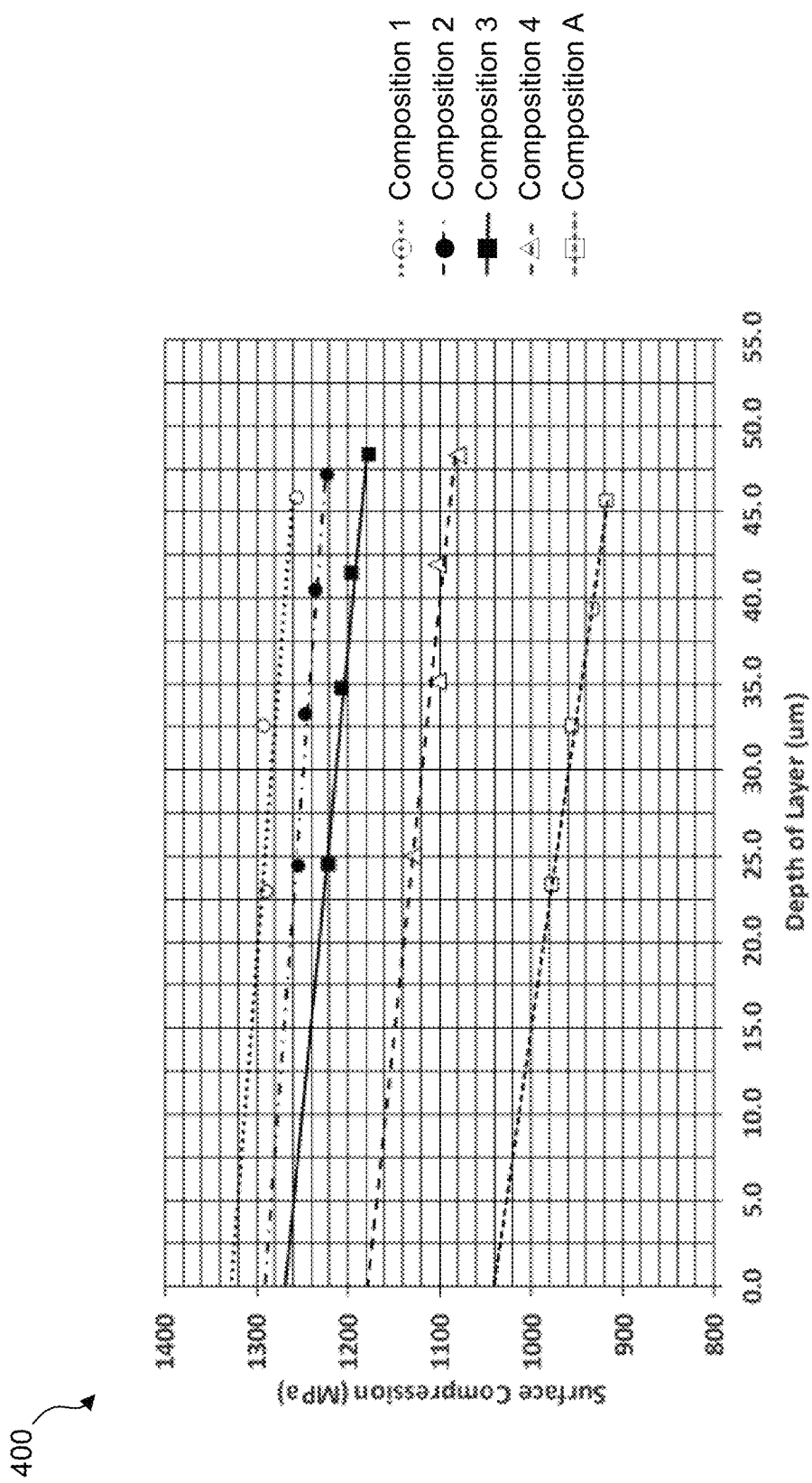
FIG. 4 is a graph of compressive stress versus depth of layer for various exemplary glass compositions.

Graph 400 in FIG. 4 plots the compressive stress values versus the depth of layer values for Compositions 1-4 and Composition A at each ion-exchange time in Table 3. The results reported in Table 3, and plotted in graph 400, illustrate how glass compositions according to embodiments described herein can outperform comparable glass compositions in terms of flexibility and strength. Glass compositions according to embodiments described herein can achieve higher CS/E ratios than comparable glass compositions at various ion-exchange times. And, as the ion-exchange time and/or DOC increases, the CS/E ratio for glass compositions described herein actually increases, whereas the CS/E ratio for comparable glass compositions can decrease as the ion-exchange temperature and time increases.

A model was used to illustrate how glass compositions according to embodiments described herein, and glass articles made from these compositions, can provide improved mechanical properties for high-strength applications that experience significant bending stresses in use, for example, flexible cover glass applications. Table 4 below shows the compositions modeled, and the modeled Poisson's Ratio and Young's modulus for each composition. Composition B was modeled as another reference composition. The composition modeled as Composition B was 60.33 mol % $SiO_2$, 19.17 mol % $Al_2O_3$, 1.81 mol % MgO, 1.72 mol % CaO, 16.84 mol % $Na_2O$, 0.01 mol % $K_2O$, 0.01 mol % $TiO_2$, 0.09 mol % $SnO_2$, and 0.01 mol % $Fe_2O_3$.

TABLE 4

|  | Composition A | Composition B | Composition 1 | Composition 2 | Composition 3 |
|---|---|---|---|---|---|
| Poisson's Ratio | 0.205 | 0.214 | 0.214 | 0.212 | 0.211 |
| Young's Modulus (GPa) | 71.3 | 75.4 | 74.7 | 74.1 | 73.7 |

The model predicts bending performance of glass as a function of thickness and plate spacing (as called "plate distance (D)") during a bend test. The model considers the existing ion-exchange profile minus the bend stress (for any given plate spacing) and then calculates the stress intensity for a surface flaw (e.g., crack) at any length.

Figure 5:
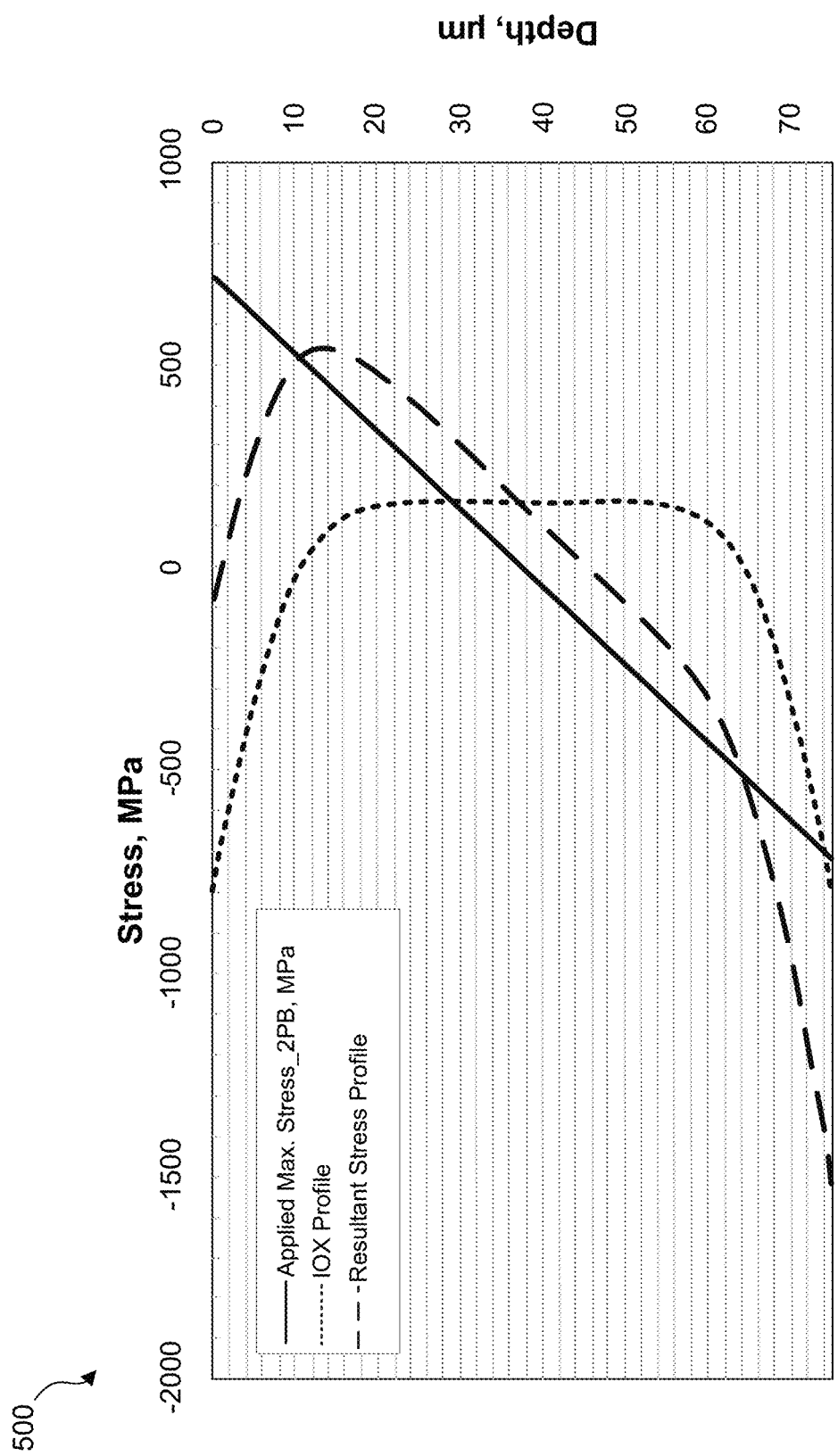
FIG. 5 is a graph modeling the stresses applied to a glass article during bending at various depths from the surface of the glass article.

For example, graph 500 in FIG. 5 shows the modeled bend, ion-exchange, and resulting total stresses applied to a 75-micron thick glass article composed of Composition A during bending at various depths from the surface of the glass article. For graph 500, the modeled peak compressive stress was 800 MPa, the modeled DOC was 15.3 microns, and the modeled plate spacing was 9.4 mm. The modeled bend stress applied by the 9.4 mm plate spacing is shown as a solid line in graph 500.

Figure 6:
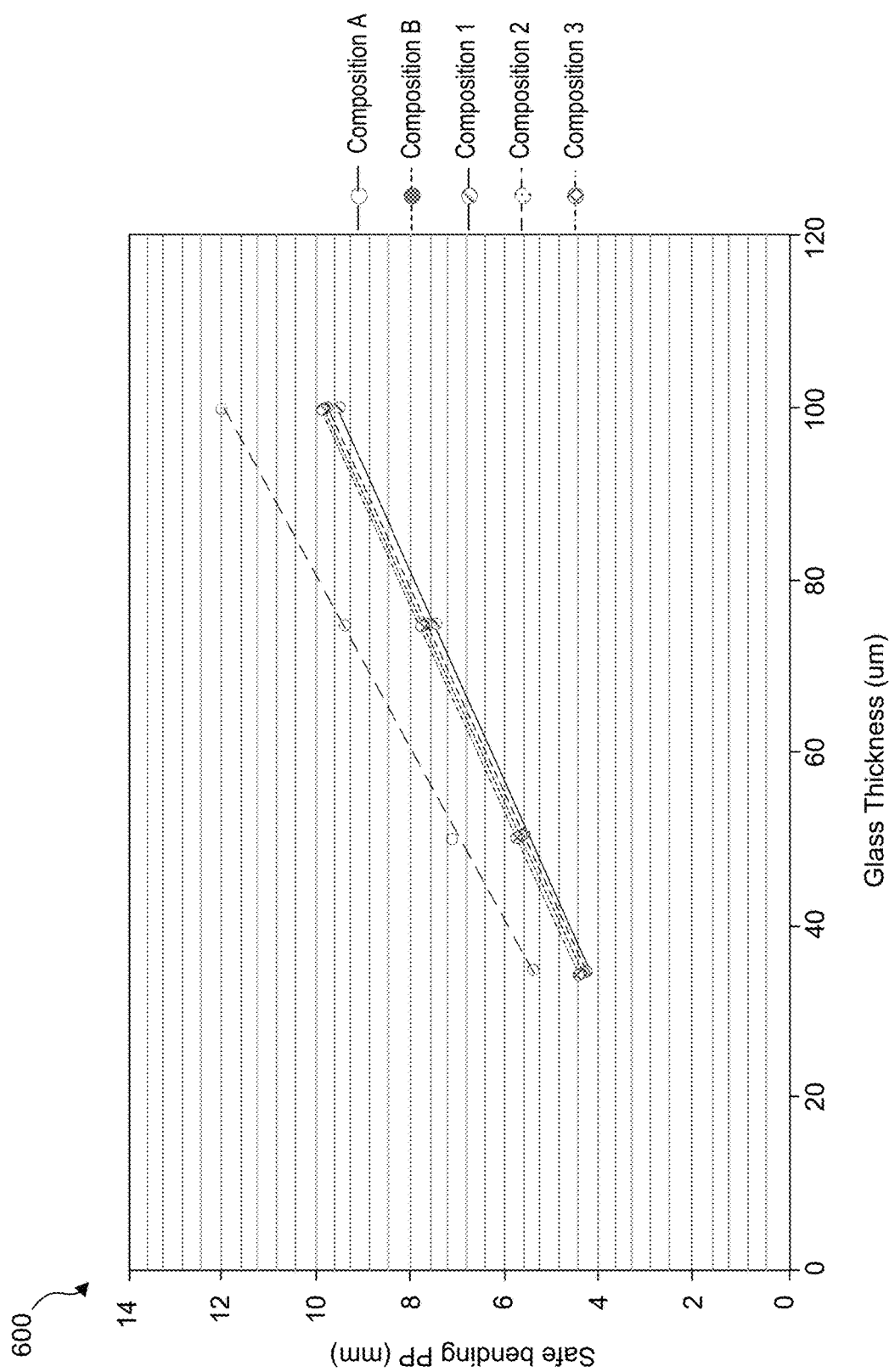
FIG. 6 is a graph modeling the safe plate spacing for a bending test as a function of glass thickness for various exemplary glass compositions.

For the model, a "safe bending" plate spacing was considered to be when the total stress ("Resultant Stress Profile") at the depth of a flaw is equal to zero, such that the bending tensile stress perfectly compensates for the ion-exchange induced compression. As shown in graph 500, "safe bending" at a plate spacing of 9.4 mm for Composition A with the molded stresses occurs when the flaw size is 1 micron or less (the smallest depth where the stress on the Y-axis is zero). Similar graphs were generated for each of the compositions and thicknesses shown below in Table 5A with the peak compressive stress values reported in the Table 5A in MPa. The "safe bending" plate spacing distance for a 1 micron flaw length for each composition and thickness shown in Table 5A is reported in Table 6. To determine the safe plate spacing reported in Table 6, the modeled bend stress as a function of molded plate spacing (solid line in graph 500) was increased until the plate spacing resulted in the "safe bending" plate spacing value for each modeled article. Graph 600 in FIG. 6 plots the safe bending plate distance results in Table 6 versus the glass article thicknesses. Table 5B reports the modeled maximum central tension values for each modeled article. The maximum CT values reported in Table 5B were approximated by the product of a maximum compressive stress and a depth of compression divided by the difference between the thickness of the substrate and twice the depth of compression.

TABLE 5A

| Thickness (μm) | DOC (μm) | Composition A | Composition B | Composition 1 | Composition 2 | Composition 3 |
|---|---|---|---|---|---|---|
| 35 | 7.1 | 750 MPa | 970 MPa | 990 MPa | 960 MPa | 940 MPa |
| 50 | 9.8 | 750 MPa | 970 MPa | 990 MPa | 960 MPa | 940 MPa |
| 75 | 15.3 | 800 MPa | 1030 MPa | 1060 MPa | 1025 MPa | 1000 MPa |
| 100 | 16.2 | 830 MPa | 1070 MPa | 1100 MPa | 1060 MPa | 1040 MPa |

TABLE 5B

| Thickness (μm) | DOC (μm) | Composition A | Composition B | Composition 1 | Composition 2 | Composition 3 |
|---|---|---|---|---|---|---|
| 35 | 7.1 | 256 MPa | 331 MPa | 338 MPa | 328 MPa | 321 MPa |
| 50 | 9.8 | 242 MPa | 313 MPa | 319 MPa | 309 MPa | 303 MPa |
| 75 | 15.3 | 276 MPa | 355 MPa | 365 MPa | 353 MPa | 345 MPa |
| 100 | 16.2 | 199 MPa | 256 MPa | 264 MPa | 254 MPa | 249 MPa |

TABLE 6

| Thickness (μm) | Composition A | Composition B | Composition 1 | Composition 2 | Composition 3 |
|---|---|---|---|---|---|
| Safe Plate Spacing (mm) assuming 1 μm flaw | | | | | |
| 35 | 5.38 | 4.40 | 4.28 | 4.37 | 4.44 |
| 50 | 7.12 | 5.83 | 5.66 | 5.79 | 5.88 |
| 75 | 9.39 | 7.73 | 7.44 | 7.63 | 7.77 |
| 100 | 12.0 | 9.86 | 9.50 | 9.78 | 9.91 |
| Liquidus viscosity and temperature | | | | | |
| | 1208 kP | 69 kP | 54 kP | 153 kP | 373 kP |
| | 1010° C. | 1230° C. | 1235° C. | 1165° C. | 1125° C. |

As shown in Table 6, the model predicted that Compositions 1-3 can avoid failure with a 1 micron flaw during a bend test at plate spacing significantly smaller than Composition A. A smaller plate spacing means that the glass compositions is better able to avoid failure during bending. At a thickness of 35 microns, glass articles composed of Compositions 1-3 were modeled as achieving a safe plate spacing of at most 4.44 mm, while the glass article composed of Composition A was modeled as achieving a safe plate spacing of 5.38 mm. At a thickness of 50 microns, glass articles composed of Compositions 1-3 were modeled as achieving a safe plate spacing of at most 5.88 mm, while the glass article composed of Composition A was modeled as achieving a safe plate spacing of 7.12 mm. At a thickness of 75 microns, glass articles composed of Compositions 1-3 were modeled as achieving a safe plate spacing of at most 7.77 mm, while the glass article composed of Composition A was modeled as achieving a safe plate spacing of 9.39 mm. At a thickness of 100 microns, glass articles composed of Compositions 1-3 were modeled as achieving a safe plate spacing of at most 9.91 mm, while the glass article composed of Composition A was modeled as achieving a safe plate spacing of 12.0 mm.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The indefinite articles "a" and "an" to describe an element or component means that one or more than one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Directional terms as used herein—for example up, down, right, left, front, back, top, bottom, inward, outward—are made only with reference to the figures as drawn and are not intended to imply absolute orientation.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example within about 5% of each other, or within about 2% of each other.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. An ion-exchanged alkali aluminosilicate glass article, comprising:
   61 mol % or more $SiO_2$;
   13.5 mol % or more $Al_2O_3$;
   1 mol % to 5 mol % MgO;
   CaO;
   $Na_2O$,
   wherein $Al_2O_3$ mol %+RO mol %≥20 mol % and ≤23 mol %, wherein RO mol %=MgO mol %+CaO mol %, wherein the glass article is substantially free of ZnO, SrO, BaO, $B_2O_3$, $P_2O_5$, $Li_2O$, and $K_2O$;
   a Young's modulus value measured in GPa before being ion-exchanged; and
   a compressive stress layer extending from a surface of the glass article to a depth of compression, the compressive stress layer comprising a peak compressive stress value measured in MPa,
   wherein a ratio of the peak compressive stress value to the Young's modulus value is 14 or more.

2. The glass article of claim 1, wherein ($Na_2O$ mol %+RO mol %−$Al_2O_3$ mol %)≥0 mol %.

3. The glass article of claim 1, wherein (MgO mol %/(MgO mol %+CaO mol %))≥0.5.

4. The glass article of claim 1, comprising a thickness in a range of 15 microns to 200 microns.

5. The glass article of claim 1, wherein the depth of compression is in a range of 5% to 20% of a thickness of the glass article.

6. The glass article of claim 1, wherein the glass article comprises a liquidus viscosity in a range of 50 kP to 500 kP, measured before being ion-exchanged.

7. The glass article of claim 1, wherein the Young's modulus value is in a range of 70 GPa to 80 GPa.

8. The glass article of claim 1, wherein the peak compressive stress is in a range of 850 MPa to 1400 MPa.

9. An electronic device, comprising
   an electronic display; and
   the glass article of claim 1 disposed over the electronic display, the electronic device further comprising a housing comprising a front surface, a back surface, and side surfaces; and electrical components at least partially within the housing, the electrical components comprising a controller, a memory, and the electronic display, the electronic display at or adjacent the front surface of the housing,
   wherein the glass article forms at least a portion of the housing.

10. A method of strengthening a glass article, the method comprising:
    immersing the glass article in an ion-exchange solution comprising 50 wt % or more of a potassium salt, the glass article comprising:
      61 mol % or more $SiO_2$;
      13.5 mol % or more $Al_2O_3$;
      1 mol % to 5 mol % MgO;
      CaO; and
      $Na_2O$, wherein $Al_2O_3$ mol %+RO mol %≥20 mol % and ≤23 mol %, wherein RO mol %=MgO mol %+CaO mol %, and wherein the glass article is substantially free of ZnO, SrO, BaO, $B_2O_3$, $P_2O_5$, $Li_2O$, and $K_2O$; and
    ion-exchanging the glass article in the ion-exchange solution for a time period in a range of 1 hour to 24 hours at a temperature in a range of 350° C. to 480° ° C. to achieve a compressive stress layer extending from a surface of the glass article to a depth of compression and comprising a peak compressive stress value in a range of 850 MPa to 1400 MPa.

11. The method of claim 10, wherein the time period is in a range of 1 hour to 8 hours.

12. The method of claim 10, wherein the glass article comprises a thickness in a range of 15 microns to 200 microns.

13. The method of claim 10, wherein the depth of compression is in a range of 5 microns to 40 microns.

14. The method of claim 10, wherein the glass article comprises a liquidus viscosity in a range of 50 kP to 500 kP measured before being immersed in the ion-exchange solution.

15. The method of claim 10, wherein the glass article comprises a Young's modulus value measured in GPa before being immersed in the ion-exchange solution, and wherein a ratio of the peak compressive stress value to the Young's modulus value is 14 or more, and is 18 or less.

* * * * *